United States Patent [19]

Lanyi et al.

[11] Patent Number: 4,547,855
[45] Date of Patent: Oct. 15, 1985

[54] PLURAL COMPUTER CONTROL FOR SHARED LASER MACHINING

[75] Inventors: William D. Lanyi, Delmont; Jack W. Clements, Trafford, both of Pa.

[73] Assignee: Westinghouse Electric Corp., Pittsburgh, Pa.

[21] Appl. No.: 414,204

[22] Filed: Sep. 1, 1982

[51] Int. Cl.⁴ .................... B23K 26/12; G05D 25/00
[52] U.S. Cl. .................... 364/474; 364/400; 219/121 LT
[58] Field of Search .......... 219/121 LA–121 LE, 219/121 LS–121 LZ, 121 LM, 121 FS; 364/400, 474, 559

[56] References Cited

U.S. PATENT DOCUMENTS

| | | | |
|---|---|---|---|
| 3,422,246 | 1/1969 | Wetzel | 219/121 |
| 3,555,239 | 1/1971 | Kerth | 219/125 |
| 3,791,466 | 2/1974 | Patterson et al. | 176/78 |
| 3,803,379 | 4/1974 | McRay | 219/121 L |
| 3,966,550 | 6/1976 | Foulds et al. | 176/78 |
| 4,083,629 | 4/1978 | Kocher et al. | 219/121 LC |
| 4,088,890 | 5/1978 | Waters | 219/121 L |
| 4,223,201 | 9/1980 | Peters et al. | 219/121 LU |
| 4,223,202 | 9/1980 | Peters et al. | 219/121 LM |
| 4,278,867 | 7/1981 | Tan | 219/85 BA |
| 4,327,277 | 4/1982 | Daly | 219/85 BM |

*Primary Examiner*—Jerry Smith
*Assistant Examiner*—Allen MacDonald
*Attorney, Agent, or Firm*—William D. Lanyi

[57] ABSTRACT

A laser machining apparatus is disclosed for machining each of at least first and second work pieces and, in particular, for conducting a sequence of machining steps on each such work piece. The laser machining apparatus includes a single, time shared laser for emitting a laser beam, and beam directing means having a movable laser reflective portion, whereby the single laser beam may be directed along a first laser path to the first work piece and along a second laser path to the second work piece. It is understood that the beam directing means is dedicated to the processing of just one work piece at a time.

24 Claims, 31 Drawing Figures

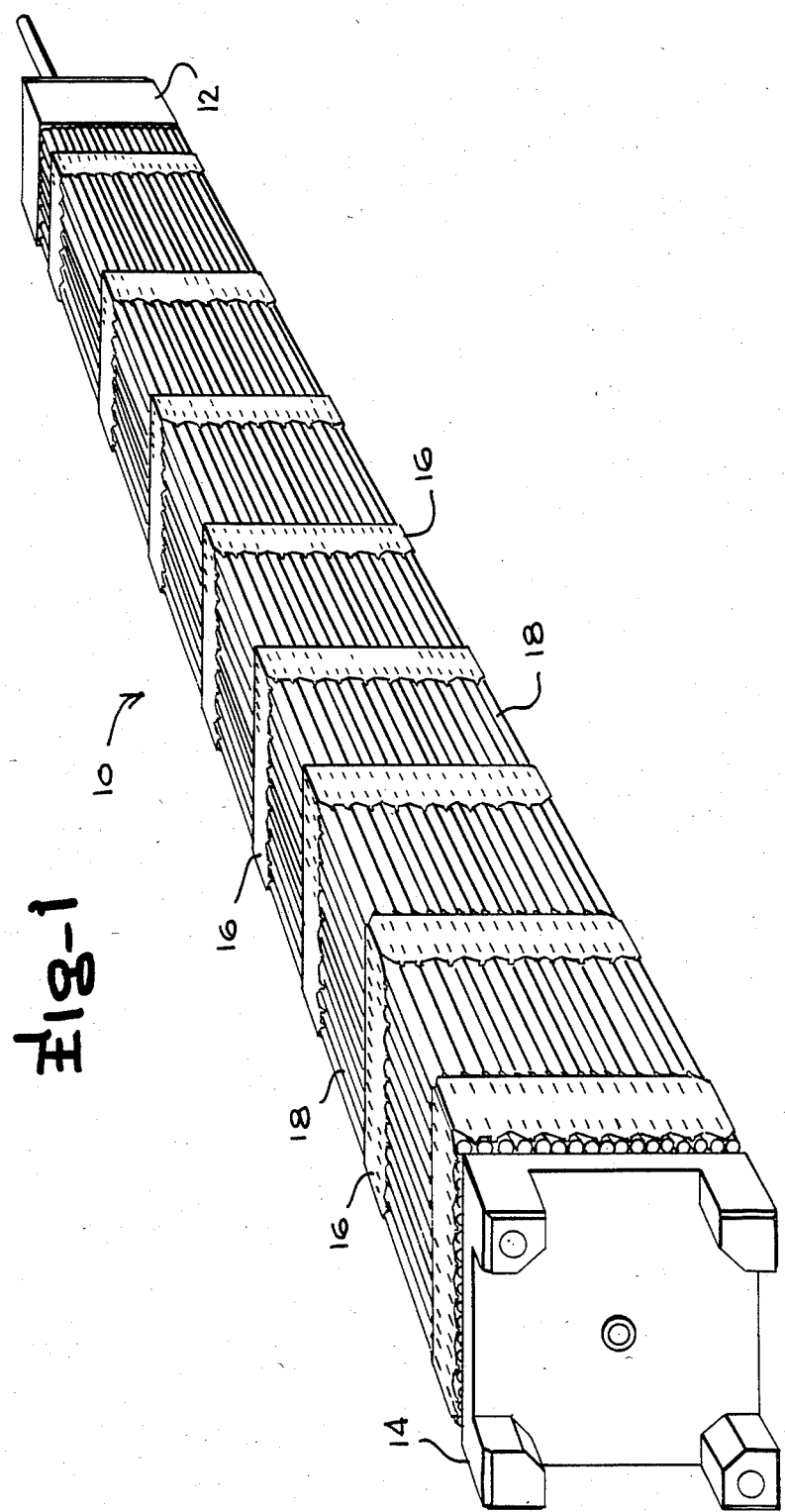

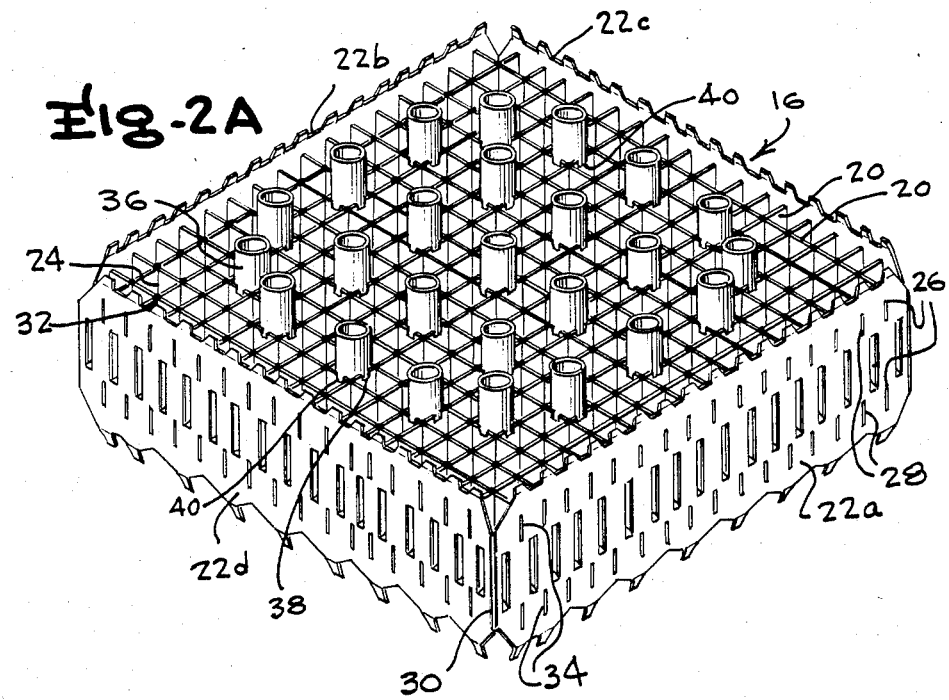
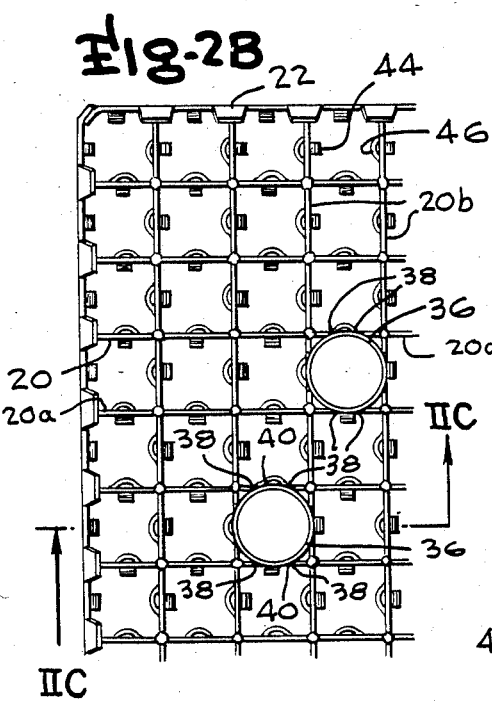
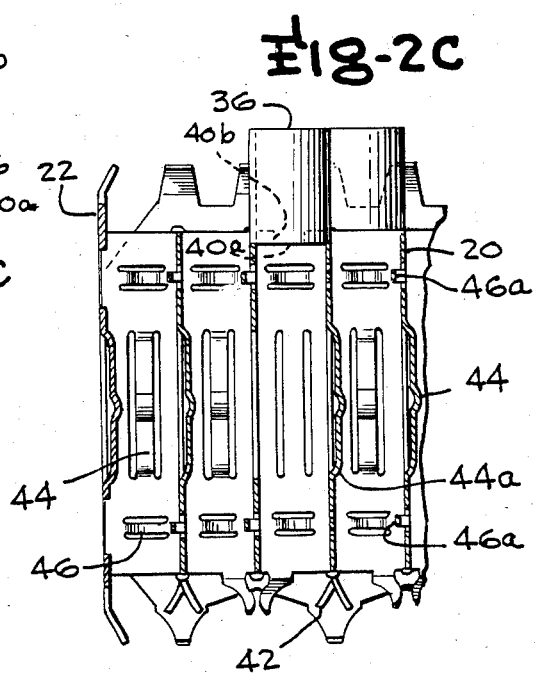

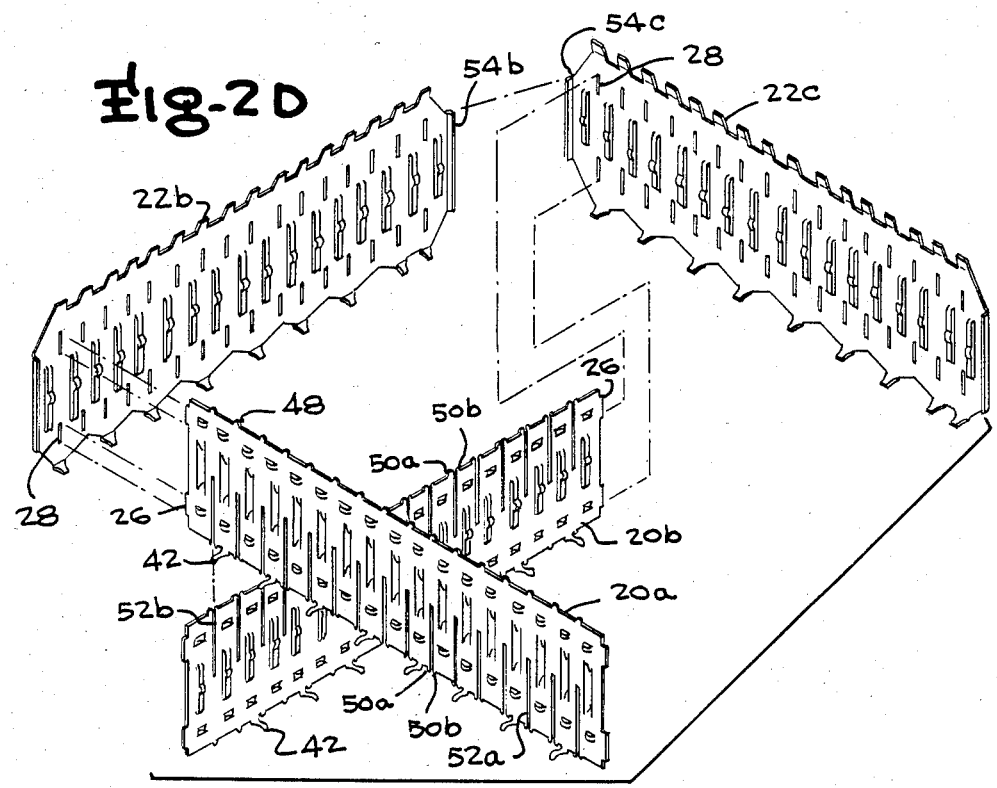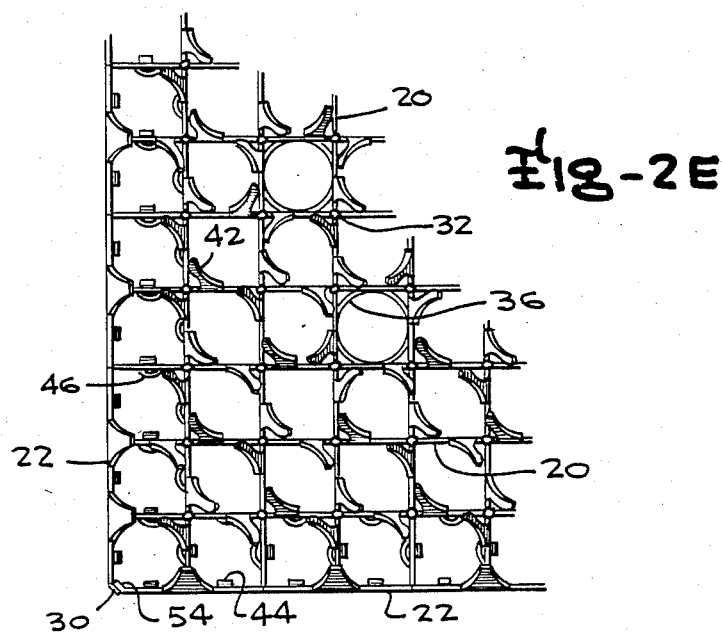

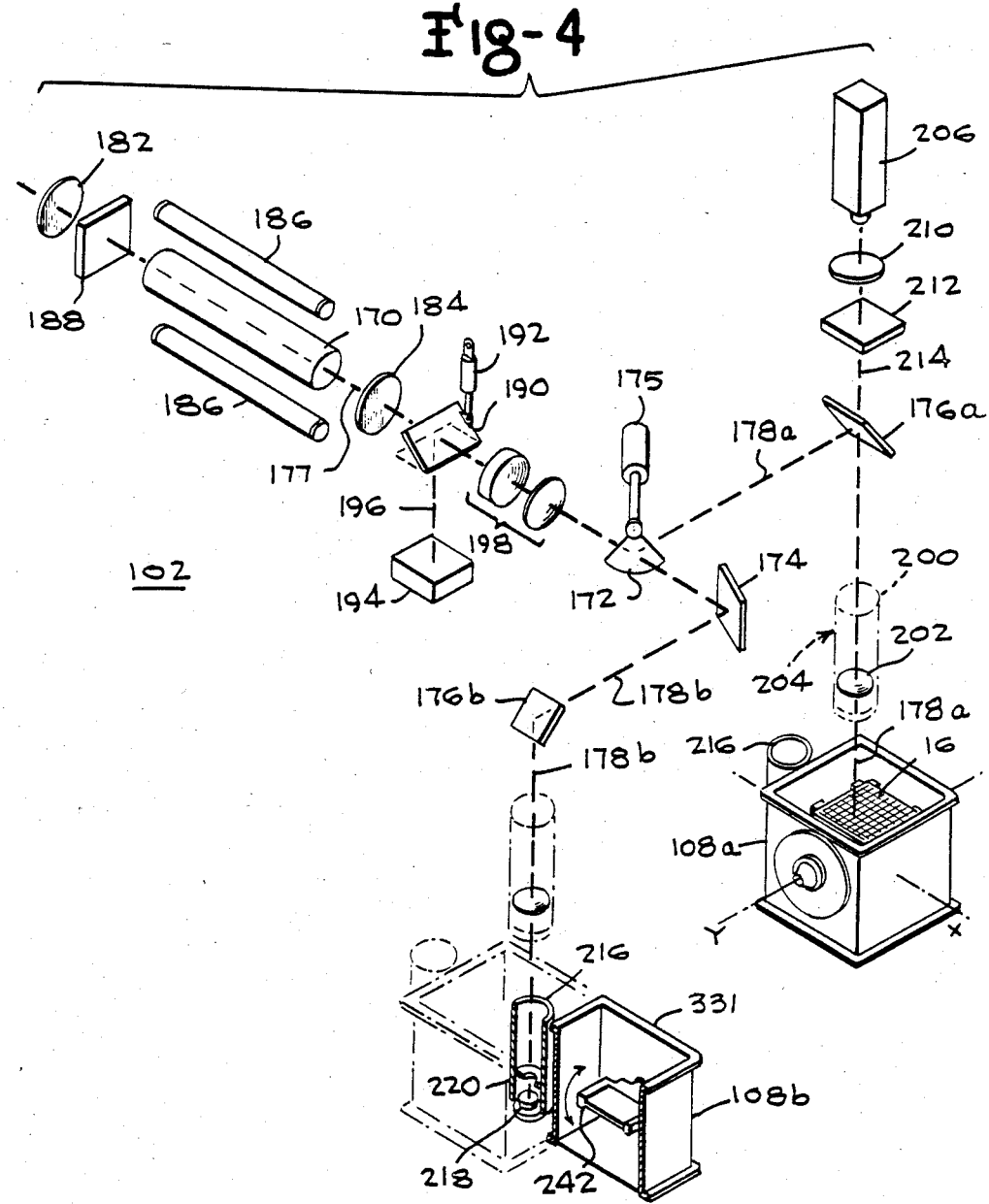

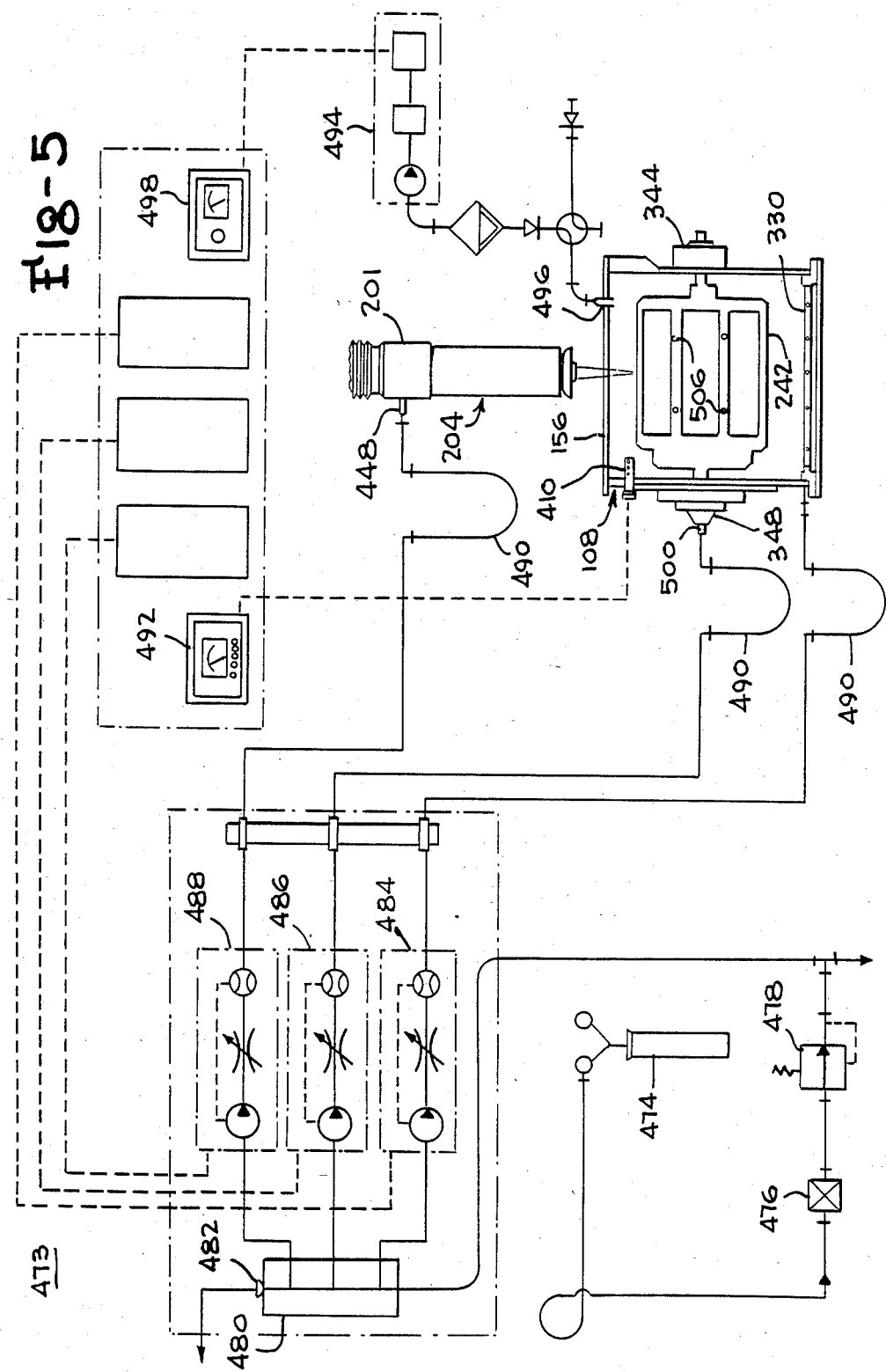

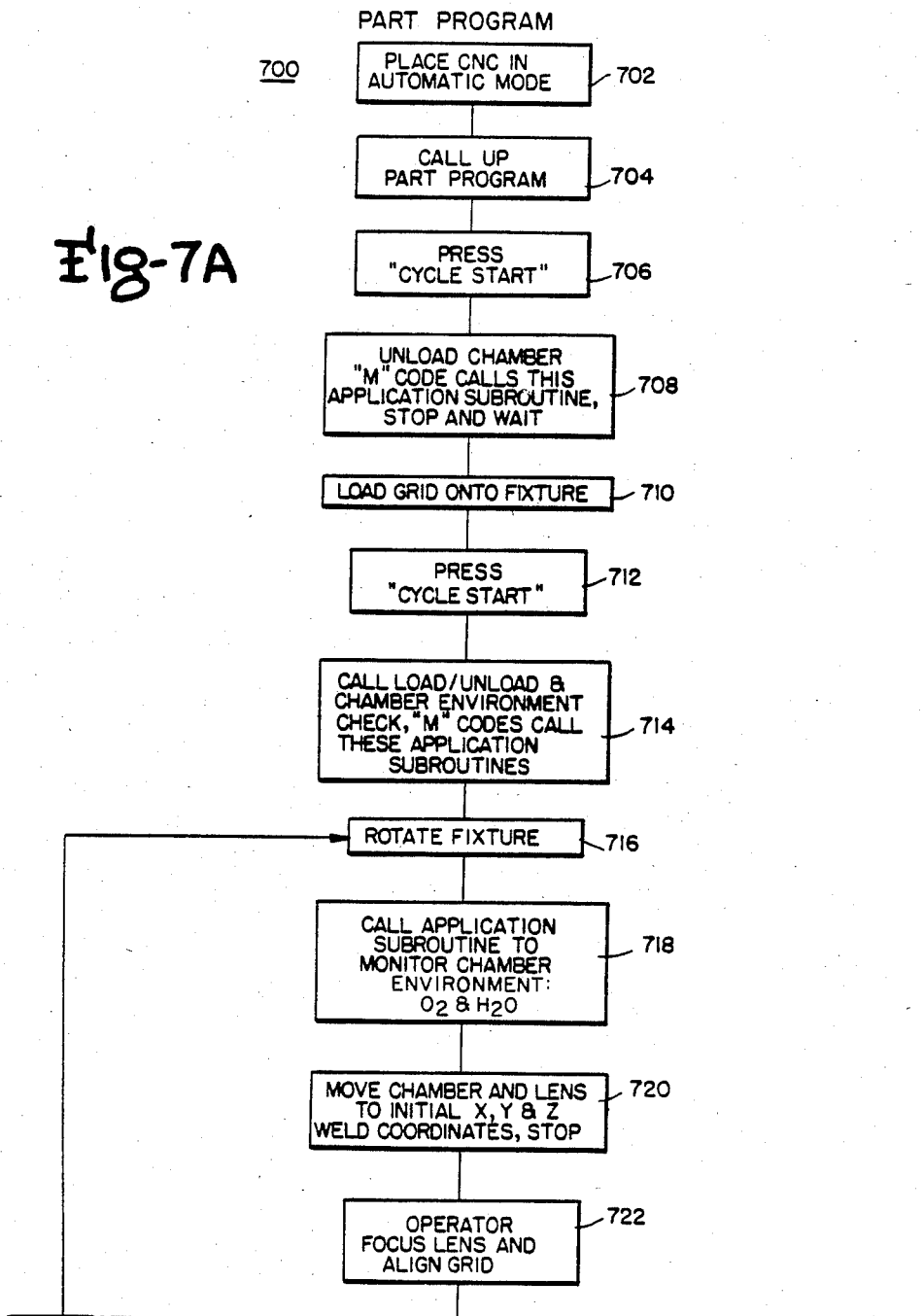

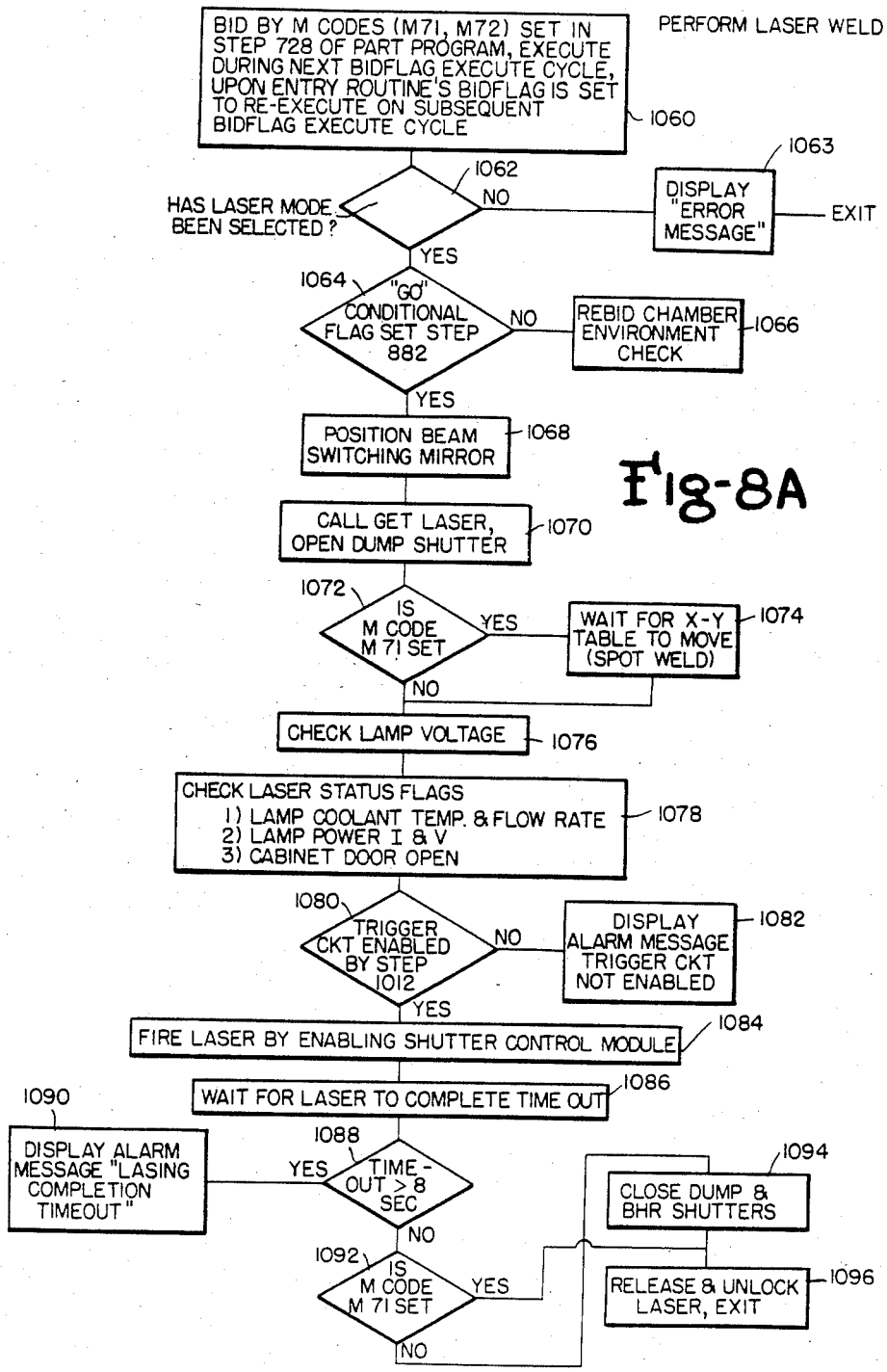

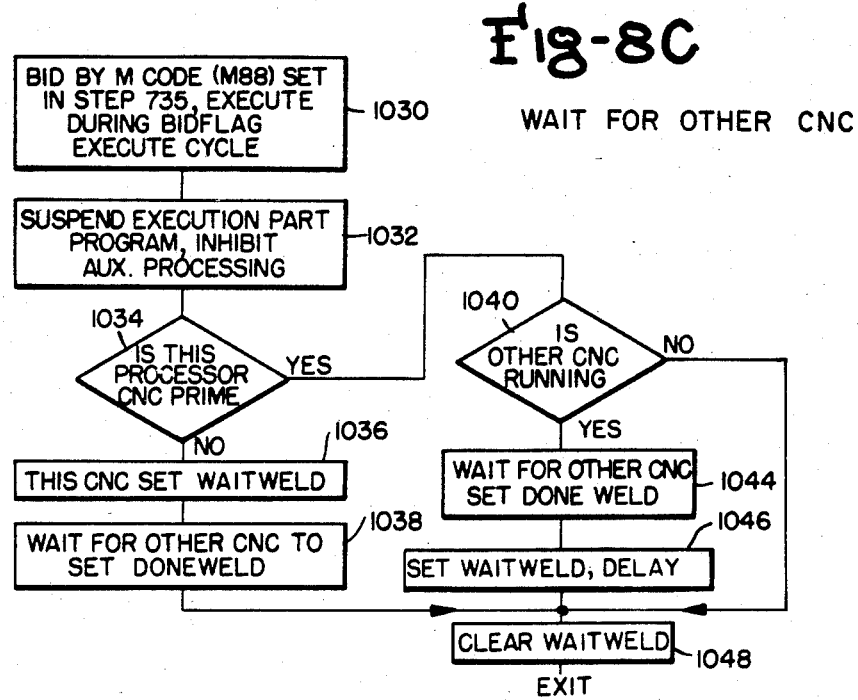

PLURAL COMPUTER CONTROL FOR SHARED LASER MACHINING

CROSS-REFERENCE TO COPENDING APPLICATIONS

Attention is drawn to the following copending, commonly assigned applications, each filed on the same date as the instant application and incorporated specifically by reference into the instant specification:

(1) "FUEL GRID WITH SLEEVES WELDED IN NOTCHED GRID STRAPS", by R. Duncan, Ser. No. 414,232 filed on Sept. 1, 1982;

(2) "PULSED LASER MACHINING APPARATUS", by R. A. Miller and G. D. Bucher, Ser. No. 414,264 filed on Sept. 1, 1982;

(3) "APPARATUS AND METHOD FOR LASER MACHINING IN NON-REACTIVE ENVIRONMENT", by R. A. Miller and G. G. Lessman, Ser. No. 414,242 filed on Sept. 1, 1982;

(4) "STRAP AND VANE POSITIONING FIXTURE FOR FUEL ROD GRID AND METHOD", by R. F. Antol, R. W. Kalkbrenner and R. M. Kobuck, Ser. No. 414,197 filed on Sept. 1, 1982;

(5) "GRID ASSEMBLY FIXTURE, RETENTION STRAP AND METHOD", by R. M. Kobuck and R. W. Kalkbrenner, Ser. No. 414,198 filed on Sept. 1, 1982;

(6) "LASER MACHINING SYSTEM", by D. L. Wolfe, J. W. Clements and J. S. Kerrey, Ser. No. 414,241 filed on Sept. 1, 1982;

(7) "MOVABLE MACHINING CHAMBER WITH ROTATABLE WORK PIECE FIXTURE", by R. F. Antol, R. Kalkbrenner and D. L. Wolfe, Ser. No. 414,263 filed on Sept. 1, 1982;

(8) "WORKPIECE GRIPPING AND MANIPULATING APPARATUS FOR LASER WELDING SYSTEMS AND THE LIKE", by R. Kalkbrenner and R. Kobuck, Ser. No. 414,262 filed on Sept. 1, 1982;

(9) "LASER LENS AND LIGHT ASSEMBLY", by R. Antol, R. Kalkbrenner and R. Kobuck, Ser. No. 414,205 filed on Sept. 1, 1982;

(10) "WELDING PLATES FOR A FUEL ROD GRID", by R. M. Kobuck, R. Miller, R. W. Kalkbrenner, J. Kerrey and R. Duncan, Ser. No. 414,265 filed on Sept. 1, 1982;

(11) "GRID AND SLEEVES WELDING FIXTURE AND METHOD", by J. S. Kerrey and R. Duncan, Ser. No. 414,203 filed on Sept. 1, 1982;

(12) "CALIBRATION OF AUTOMATED LASER MACHINING APPARATUS" by J. W. Clements and J. R. Faulkner, Ser. No. 414,272 filed on Sept. 1, 1982; and

(13) "RIGID SUPPORT FOR LASER MACHINING APPARATUS", by D. L. Wolfe, Ser. No. 414,191 filed on Sept. 1, 1982.

BACKGROUND OF THE INVENTION

1. Field of the Invention

This invention, in its preferred form, relates to apparatus for laser machining, and in particular laser welding, of at least first and second work pieces. More specifically, this invention relates to plural computer controls for controlling the laser machining operations on the first and second work pieces including the control of the movements of each work piece so that they are accurately positioned with respect to a laser beam, whereby a sequence of laser machining steps may be carried out on each work piece under the control of its associated computer. More particularly, this invention relates to apparatus for welding the elements, i.e. grid spacers, of a nuclear fuel rod grid.

2. Description of the Prior Art

The precision laser welding apparatus of this invention relates generally to the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assemble 14, between which is disposed a matrix of nuclear fuel rods 18 arrayed in rows and columns and held in such configuration by a plurality of fuel rod grids 16. Through not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and, therefore, the orientation of the fuel rods 18 with respect to each other is rigorously controlled.

The precision laser welding apparatus of this invention is, in one illustrative embodiment thereof, related to the manufacture of fuel rod grids 16 as shown in FIGS. 2A to 2E. The fuel rod grid 16 is of an approximately square configuration, whose periphery is formed by four outer grid straps 22. Each end of an outer grid strap 22 is welded by a corner seam weld 30 to the end of a perpendicularly disposed outer grid strap. A plurality of inner grid straps 20 is disposed in rows and columns perpendicular to each other, whereby a plurality of cells are formed to receive the control rods and the nuclear fuel rods 18. The inner grid straps 20 disposed along the rows and columns have complementary slots therein at each of the points 24 of intersection for receiving a perpendicularly disposed inner grid strap 20. An intersect weld 32 is formed at each of the points 24 of intersection, whereby a rigid egg crate structure is formed. Further, each of the inner grids straps 20 includes at each end a pair of tabs 26 of a size and configuration to be tightly received in either a top or bottom row of slots 28 formed in the outer grid straps 22, as shown in FIG. 2A. A slot and tab weld 34 is effected along the top and bottom rows formed by the slots 28 within the outer grid straps 22. Further, a plurality of guide sleeves 36 is disposed on the sleeve side surface of the fuel rod grid 16 to receive and guide the control rods disposed therein. A series of notch seam welds 40 securely attach the guide sleeves 36 to corresponding notches 38 formed within the inner grid straps 20. The precision laser welding apparatus of this invention is particularly adapted to perform a series of controlled welding operations whereby each of the welds 30, 32, 34 and 40 is carried out. The precision laser welding apparatus of this invention not only controls the various parameters of generating the laser in terms of the pulse width, the pulse height of each laser pulse, and the number of pulses to be applied to each weld, but also controls the sequential positioning of the fuel rod grids 16 with respect to the laser beam. It is understood that after each such weld, the fuel rod grid 16 is repositioned and/or the focal point of the laser beam changed to effect the particular type of weld desired.

Referring now to FIGS. 2B and 2C, the plurality of resilient fingers 44 is disposed longitudinally of the inner grid straps 20 in a parallel relationship to each other. A pair of spacing fingers 46 is disposed on either side of a corresponding resilient finger 44 and serves along with the resilient finger 44 to provide a resilient grip of the nuclear fuel rods 18 that are disposed within the cell formed by the intersecting inner grid straps 20. A resilient finger 44a is disposed to the right as seen in FIG. 2C in an opposing relationship to the spacing finger 46a, whereby a nuclear fuel rod 18 is resiliently held therebetween.

The manner of assembling the inner grid straps 20 to each other as well as to the outer grid straps 22 is shown in FIG. 2D. Each of the inner grid straps 20 includes a plurality of complementary slots 52. An upper grid strap 20a has a downwardly projecting slot 52a, whereas a lower grid strap 20b has a plurality of upwardly oriented slots 52b of a configuration and size to be received within a corresponding slot 52a of the inner grid strap 20a. At each end of the inner grid strap 20, there is disposed a pair of the tabs 26 to be disposed within corresponding slots 28 of an outer grid strap 22.

As will be explained in detail later, the inner grid straps 20 are welded to each other by the intersect welds 32 as formed of projection tabs 48 and tab portions 50a and 50b. More specifically, a projection tab 48 is disposed between a corresponding set of tab portions 50a and 50b when the inner grid straps 20a and 20b are assembled together. Upon the application of a laser beam to the tab 48 and tab portions 50a and 50b, an intersect weld 32 is formed that is rigidly strong and free of contamination in accordance with the teachings of this invention. Further, each end of an outer grid strap 22 has a corner tab 54. As shown in FIG. 2D, the outer grid straps 22c and 22b have respectively corner tabs 54b and 54c that overlap each other and are seam welded together to form the corner seam weld 30.

The vanes 42 project, as seen in FIGS. 2C and 2E, from a vane side of the fuel rod grid 16 to enhance the turbulence of the water passing over the nuclear fuel rods 18. Further, as illustrated particularly in FIG. 2C, the guide sleeves 36 are aligned with cells formed by the inner grid straps 20 that are free of either a resilient finger 44 or spacing finger 46, to thereby permit the free movement of the control rod through the cell and through the guide sleeve 36.

U.S. Pat. No. 3,966,550 of Foulds et al., and U.S. Pat. No. 3,791,466 of Patterson et al., assigned to the assignee of this invention, disclose similarly configured fuel rod grids of the prior art. Each of these patents discloses a fuel rod grid wherein the inner and outer grid straps are made of a suitable metallic alloy such as Inconel, and the above identified interconnections are effected by furnace brazing. However, the zirconium alloy Zircaloy is known to have the desirable characteristics of a low neutron absorption cross section which allows for more efficient use of the nuclear fuel in the utility operation and therefore allows for a longer elapsed time between refueling by the replacement of the nuclear fuel bundle assemblies. In particular, fuel rod grids made of Zircaloy have a lower absorption rate of the neutrons generated by the fuel rods than that absorption rate of straps made with Inconel. The making of the grid straps of Zircaloy requires at least several changes in the assembly of the fuel rod grids. First, it is necessary to make the slots, whereby the inner grid straps may intersect with each other, of looser tolerances in that grid straps made of Zircaloy do not permit a force fitting thereof, i.e. to be hammered into position, but rather require controlled fit-up to allow "push-fits" of the intersecting grid straps. In addition, Zircaloy grid straps may not be brazed in that heating Zircaloy to a temperature sufficient to melt the brazing alloy would anneal the Zircaloy, resulting in a loss of mechanical strength.

U.S. Pat. No. 3,555,239 of Kerth is an early example of a large body of prior art disclosing automated laser welding apparatus in which the position of the work piece, as well as the welding process, is controlled by a digital computer. Kerth shows the control of laser beams while controlling the work piece as it is moved from side to side along an X axis, horizontally forward and backward along a Y axis and vertically up and down along a Z axis. Typically, pulse driven motors are energized by the digital computer to move the work piece rectilinearly along a selected axis. In addition, the welding is carried out within a controlled atmosphere and, in particular, the pressure and flow of gas into the welding chamber is controlled by the digital computer. Further, a counter is used to count pulses, whereby the number of laser pulses applied to the work piece may likewise be controlled.

U.S. Pat. No. 4,088,890 of Waters discloses a programmable controller for controlling laser emission and, in particular, the control of a high beam shutter whereby the desired quantity of laser emission is directed onto the work piece. This patent also discloses the rectilinear movement of a carriage carrying the work piece along a vertical axis, whereby the work piece is successfully brought to a position, where a laser weld is made. In particular, there is disclosed the effecting of a seam weld, whereby the work piece is rotated while the laser beam is directed at a seam between two pieces to be welded together.

U.S. Pat. No. 3,422,246 of Wetzel discloses a laser cutting machine tool including a servo system for controlling servo drive motors to drive a work piece along X and Y drive axes respectively. A transducer is associated with each of the servo motors to provide feedback signals indicative of the movement of the work piece along its respective axis to thereby ensure accurate work piece position.

In the initial development of laser machining systems, lasers were employed for individual, low production machining operations. With the development of the art, laser systems were increasingly employed for high production work processing operations as would be controlled automatically by computers. As described above, such high production systems operate efficiently to reposition the work piece, whereby a sequence of welds or other machining operations may be rapidly performed. Under such demands of continuing excitation, laser life becomes a factor in terms of efficient operation and of cost of production. It is contemplated that under high usage where repeated welds are required, as for the production of the above described fuel rod grids, that laser life would be a significant factor to consider. Under heavy usage, the life expectancy of the lamps exciting the pulsed laser would be in the order of several days, and after this life had been expended, it would be necessary to replace at least the lamps, as well as to calibrate the new laser system.

In order to improve laser efficiency and life, the prior art as illustrated by U.S. Pat. Nos. 4,223,201 and 4,223,202 of Peters et al. and U.S. Pat. No. 4,083,629 of Kocher et al., discloses the time sharing of a laser beam emitted from a single laser and alternatively directed along first and second optical paths onto a single work piece. U.S. Pat. No. 4,083,629 describes problems with automated welding systems wherein the work piece requires a plurality of welds to be made; in particular, the work piece may be brought to a first station, where a first welder is operated, and then transferred to a second station, whereat a second welder effects a welding operation. Alternatively, two welders could be used at a single station to effect the plurality of welds, thus minimizing the need to transport the work piece from the first to the second stations. However, these methods require that either the work piece be transported or reoriented, thus decreasing the production rate, or that two welders be used, thus substantially increasing the capital investment of such apparatus. As an attempt to overcome these problems, U.S. Pat. No. 4,083,629 suggests the use of a bimodal switching means, whereby the laser welder sequentially welds at two distinct weld sites. In particular, there is suggested a motor for rotating a reflected mirror, whereby the beam is alternately directed along a first and then a second focal path to the work piece to effect first and second welds on a single work piece such as an electrical component. It is apparent that there is an automated control of the laser welder to synchronize the firing of the laser with the switching of the laser beams, the wire cutting, and other handling operations. U.S. Pat. No. 4,223,201 describes a somewhat similar laser system adapted for larger work pieces such as would be encountered in ship construction. In particular, U.S. Pat. No. 4,223,201 suggests the use of a rotating mirror to sequentially direct the laser beam along first and second paths, whereby a single laser beam may be time shared. In addition, a suitable automatic controller is employed to control corresponding first and second welding heads that are moved in timed relationship with the beam sharing, so as to effect sequentially a series of welds at two different locations on a single work piece. U.S. Pat. No. 4,223,202 suggests the seam welding of two pieces together with the welding taking place on opposite sides of the work pieces at substantially the same point to effect a two sided laser seam weld, while the automated controller effects movement of the welding heads with respect to the work piece.

The above-referenced patent of Kocher et al. discloses the time shared control of a single laser source, whereby the laser beam may be split and directed along separate paths onto machining or weld sites. The Kocher et al. patent discloses that each of the two weld sites is disposed on a single work piece. Thus, there is no disclosure of the problems associated with the machining of two work pieces, where it is desired to time share control a single laser source and for directing its beam along separate paths onto the two distinct work pieces. In such a laser machining apparatus, it is typically desired to control the machining processes of each work piece. Each work piece is associated with its own work station and as contemplated by this invention, includes means for positioning each work station selectively in three dimensions with respect to the laser beam directed to that work station. In addition, it is contemplated that the material of which each work piece is made, is reactive to the normal atmosphere, and that it will be necessary to conduct the laser machining in an environment that is non-reactive to the work piece material. Thus, it is necessary to provide a sequence of control instructions to each work piece to not only effect the desired sequence of movements, but also to control the environment of each work station to ensure the production of high quality laser machining and in particular, welding.

The Kocher et al. patent also discloses laser welding apparatus and in particular suggests the use of a diverter mechanism disposed to intercept the laser beam, whereby the laser beam may be diverted into a heat sink. In particular, this patent suggests that the laser beam be diverted into a heat sink while the work piece is being replaced with another. Though such a technique permits the laser to keep firing at a uniform rate without being shut down so that its temperature, once established under equilibrium conditions, will not be altered between machining operations, this technique significantly reduces the efficiency of operation in that the laser machining and in particular the laser welding takes place for a relatively short period of time as compared to the time required to move or to replace the work piece.

SUMMARY OF THE INVENTION

It is therefore an object of this invention to provide a new and improved laser machining apparatus that is capable of achieving increased efficiency for the production of work pieces.

It is a more particular object of this invention to provide a new and improved laser machining apparatus that is capable of laser machining at least two work pieces at the same time.

It is a more particular object of this invention to provide a new and improved laser machining apparatus that is capable of laser machining at least two work pieces and in particular, to time share control a single laser source directing its laser beam to one work piece while moving the other work piece in preparation for further laser machining.

In accordance with these and other objects of the invention, there is disclosed a laser machining apparatus for machining each of at least first and second work pieces and in particular, for conducting a sequence of machining steps on each such work piece. The laser machining apparatus includes a single, time shared laser for emitting a laser beam, and beam directing means in the illustrative form of a member having a laser transmissive portion and a laser reflective portion, whereby the single laser beam may be directed along a first laser path to the first work piece and along a second laser path to the second work piece. It is understood that the beam directing means is dedicated to the processing of just one work piece at a time.

In a significant aspect of this invention, each work station includes means for positioning its work piece so that between machining steps as effected by the laser beam, the work piece is selectively repositioned in preparation for the next laser machining step. For example, the positioning means may take the form of X and Y driven tables, whereby each work piece is moved along X and Y axes with respect to the laser path so that the work piece is positioned for the next laser machining step.

In a further aspect of this invention, each work piece is associated with a distinct control computer, each computer competing to control the operation of the beam directing means, it being understood that only one control computer may gain access of the control of the beam directing means. To this end, each computer control has a priority determining means that is coupled by a suitable link to a similar means of the other control computer, whereby when one computer has bid and obtained control of the beam directing means and its laser source, that the other control computer is precluded from gaining such control.

However, the other control computer that is inhibited from controlling the beam directing means and the laser source, still has full control over the work piece positioning means, as well as the other related processing means associated with its work piece, to continue the machining process, even when the laser beam is not being directed to that work piece. As a result, a significant increase of production efficiency is achieved in accordance with the teachings of this invention by permitting the other, inhibited computer control to continue to access and to control the positioning means of its work station, whereby its work piece may be repositioned for the next laser machining step.

In a further aspect of this invention, one of the plural control computers is designated as the selected or prime control computer, whereby the prime control computer sets the particular mode of machining, e.g. welding, including illustratively the frequency and pulse width of the laser pulses applied to its work piece. However, each control computer sets its own laser voltage, i.e. that voltage that is applied to the pulse forming network, whereby energizing pulses are applied to its laser excitation lamps. In this manner, each computer control may adjust based on calibrating measurements, the intensity of its laser beam that is directed to its work piece as a function of the optical path along which its laser beam is directed to its work piece.

BRIEF DESCRIPTION OF THE DRAWINGS

A detailed description of a preferred embodiment of this invention is hereafter made with specific reference being made to the drawings in which:

FIG. 1 is a perspective view of a nuclear fuel bundle assembly incorporating a plurality of grids made in accordance with the teachings of this invention;

FIGS. 2A–2E are respectively a perspective view, a plan view, a sectioned side view, a perspective exploded view and a plan view of a fuel rod grid made in accordance with the teachings of this invention and incorporated into the assembly of FIG. 1;

FIG. 4 is a perspective, schematic representation of the laser system as incorporated into the precision laser welding apparatus as shown in FIGS. 4 and 5 for directing on a time shared basis a laser beam emitted from a single laser source to each of two work pieces, e.g. nuclear fuel rod grids;

FIG. 5 is a schematic diagram of an argon supply system, whereby a suitable inert gas, e.g. argon, is supplied from a tank thereof to each of the welding chambers and laser focusing lens assemblies;

FIGS. 7A and 7B are a high level flow diagram of the part program illustrating the steps of the control process whereby the laser welding system is controlled to effect a series of welds of the nuclear rod grid in a precise fashion;

FIGS. 8A, 8B, 8C and 8D are application subroutines that are bid by M, S and T codes set by the part program as illustrated in FIGS. 7A and 7B, and in particular, disclose the PERFORM LASER WELD, SYNC, WAIT FOR OTHER CNC and GET LASER application subroutines, respectively.

DESCRIPTION OF THE PREFERRED EMBODIMENT

Figure 3A:
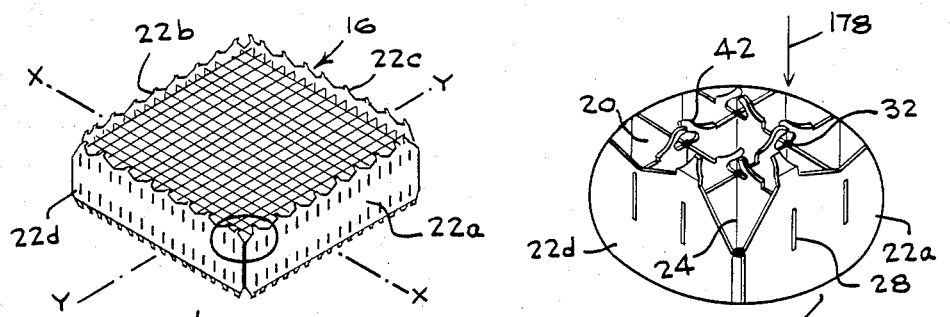
FIGS. 3A–3L show in a series of perspective views the sequence of steps for welding the nuclear rod grid as shown in FIG. 2.

The fuel rod grids 16 are comprised as described above of the inner and outer grid straps 20 and 22 that are assembled and welded together as shown in FIGS. 2A to 2E. Each of the grid straps 20 and 22 is punched from a continuous roll of slit material and accumulates some surface oil in the punching operation. The oil film is cleaned and thereafter, the strap is annealed and then assembled into a work fixture as described in copending application entitled "GRID ASSEMBLY FIXTURE, RETENTION STRAP AND METHOD" U.S. patent application Ser. No. 414,198 filed on Sept. 1, 1982. Thereafter, the grid 16 and fixture are welded by the laser welding system 100 of this invention which carries out each of the intersect welds 32, the corner seam welds 30, the slot and tab welds 34, and the notch seam welds 40 in a pure atmosphere of an inert gas. Referring now to FIGS. 3A to 3L, the sequence of the welding steps in the inert gas is described in accordance with the teachings of this invention. The laser welding system 100 will be described in detail later; it is believed that an understanding of the manner in which the work piece, i.e. the fuel rod grid 16, is manipulated in each of three dimensions will facilitate an understanding of the operation of the laser welding system 100. As is apparent from these drawings, the fuel rod grid 16 is incrementally moved along its X and Y axes within a plane and is selectively rotated about its Y axis. Significantly, the aforementioned motion is carried out within a chamber wherein the atmosphere of the inert gas is maintained to a high degree of purity. The first step is illustrated in FIG. 3A, wherein the fuel rod grid 16 is disposed within the controlled atmosphere as formed by the welding chamber with its vanes 42 extending upwardly. A welding fixture is described in the copending application entitled "WELDING PLATES FOR A FUEL ROD GRID" U.S. patent application Ser. No. 414,265 filed on Sept. 1, 1982, whereby the inner and outer grid straps 20 and 22 are fixedly disposed with respect to each other during the welding operations. A vane suppressor fixture is a tool that is used for deflecting the vanes 42, whereby the vanes are fitted within the welding fixture; the vane suppressor fixture is described in the copending application entitled "STRAP AND VANE POSITIONING FIXTURE FOR FUEL ROD GRID AND METHOD" U.S. patent application Ser. No. 414,197 filed on Sept. 1, 1982. The atmosphere is purified by directing argon gas into the welding chamber until the desired degree of purity is reached, i.e. 10 ppm of water and 7 ppm oxygen. When the pure atmosphere has been established, the fuel rod grid 16 is moved in a series of incremental movements along the X and Y axes, whereby each of the points 24 of intersection between inner grid straps 20 is aligned with a laser beam 178 and thereafter, a controlled amount of energy is imparted thereto to effect the intersect weld 32. As will be explained in detail later, the laser beam 178 is provided by a pulsed Nd:YAG laser that is excited by pulsed excitation lamps energized by a calibrated reservoir voltage to deliver a specified level of energy to the grid 16. In particular, the number of pulses directed onto the point 24 of intersection of the inner grid straps 20 is controlled, wherein six pulses of the laser beam are directed onto the work piece to form the intersect weld 32, each pulse having a pulse width of 6.2 ms, a rate of 20 pulses per second (pps), an average power of 350 watts and a peak power of 2,580 watts. The intersect welds 32 are formed by turning on the laser beam 178 when the fuel rod grid 16 has been disposed in an aligned position with respect to the laser beam 178.

Figure 3B:
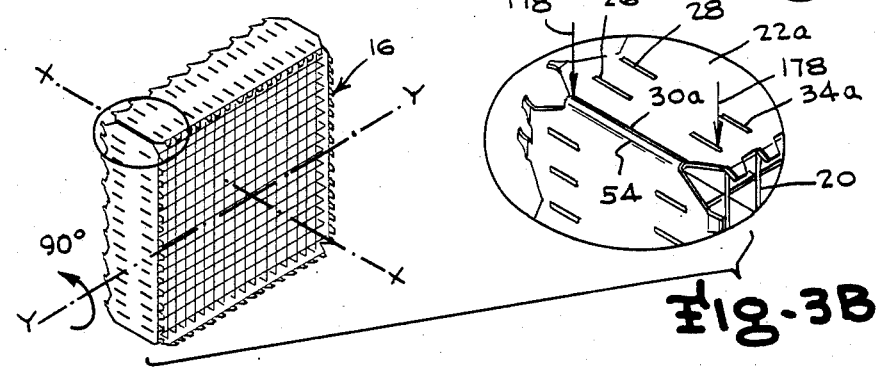

The next step is shown in FIG. 3B, wherein the fuel rod grid 16 is rotated about its Y axis 90° by a mechanism to be explained, whereby a first set of the slot and tab welds 34 and a first corner seam weld 30 are performed. These welds are seam welds which are carried out by moving the fuel rod grid 16 along its X axis while directing the laser beam 178 onto the work piece. In an illustrative embodiment of this invention, the slot and tab welds 34 are effected with a laser beam 178 of a pulse width of 2.2 ms, a pulse frequency of 50 pps, and an average of 350 watts, with the fuel rod grid 16 being moved at a rate of 30 inches per minute (IPM). FIG. 3B shows the relative position of the laser beam 178 to effect each of the slot and tab welds 34a and the corner seam weld 30a.

Figure 3C:
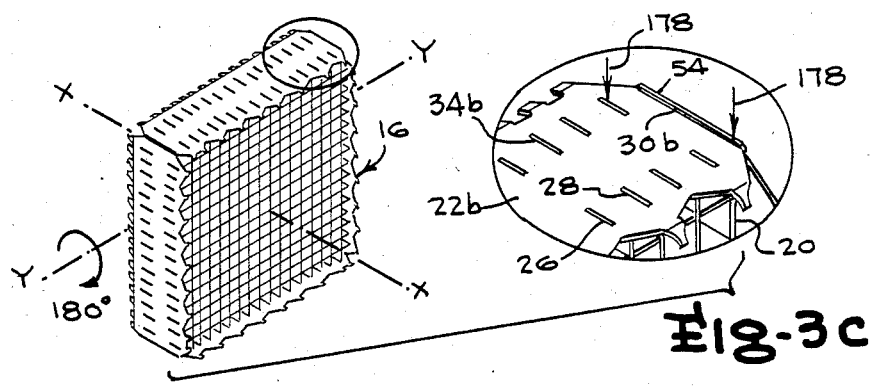
Figure 3D:
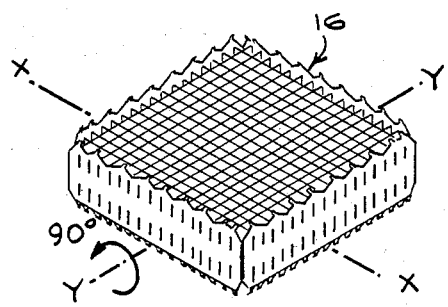

Next, as shown in FIG. 3C, the fuel rod grid 16 is rotated in a clockwise direction so that the opposing outer grid strap 22b is aligned with respect to the laser beam 178, whereby a second set of slot and tab welds 34b and a second corner seam weld 30b may be carried out. Thereafter, as shown in FIG. 3D, the fuel rod grid 16 is rotated 90° counter-clockwise to its original position as shown in FIG. 3A, and the fuel rod grid 16 and its weld fixture are removed from the welding chamber.

Figure 3E:
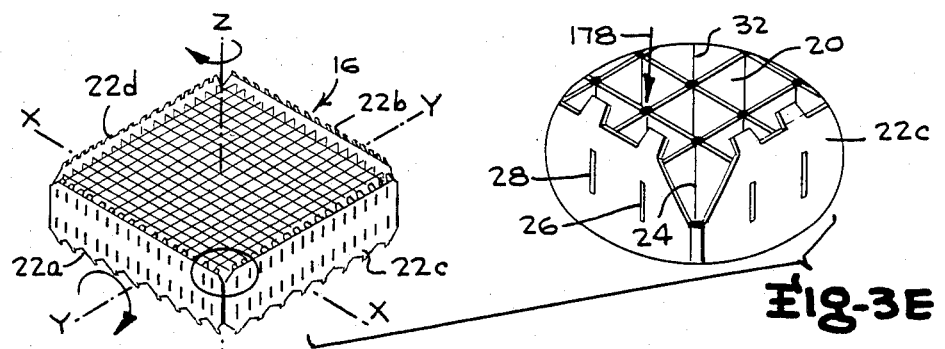
Figure 3F:
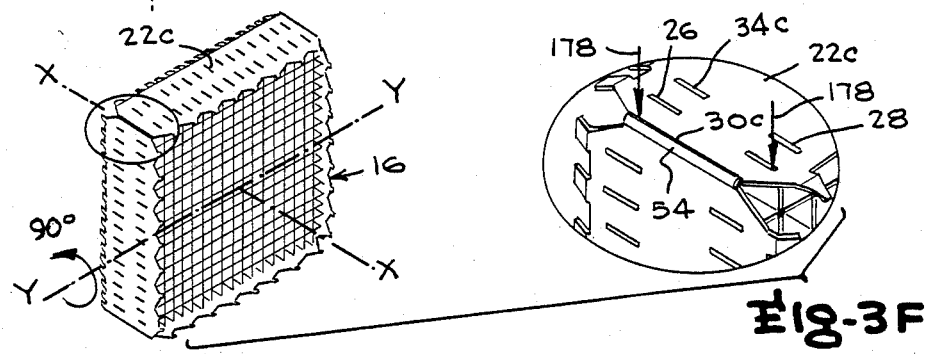
Figure 3G:
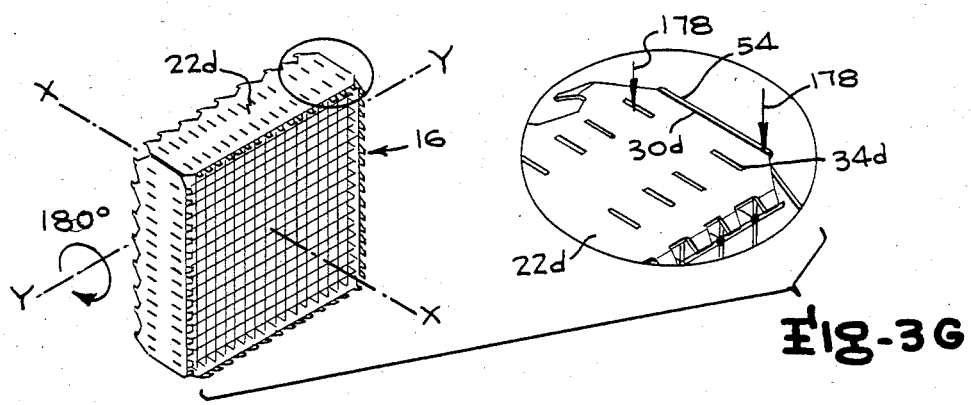
Figure 3H:
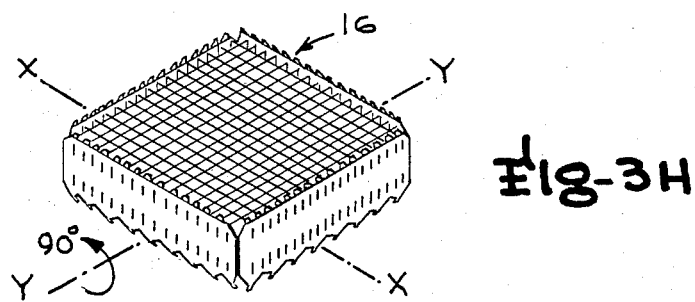
Figure 3I:
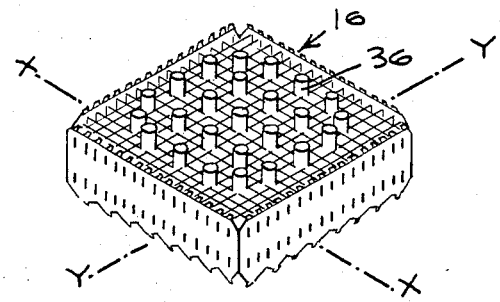

As shown in FIGS. 3E to 3H, a similar set of welding steps are carried out. After removal from the chamber, the fuel rod grid 16 and its weld fixture are turned over to dispose its vane side down and are rotated about its Z axes 90° in clockwise direction so that the unwelded outer grid strap 22c faces the door of the welding chamber. The grid 16 and its weld fixture are locked into a secure position with respect to the welding chamber and the laser beam. Initially, the air within the welding chamber is purged with argon gas to an acceptable level of purity. Thereafter, as shown in FIG. 3E, the fuel rod grid 16 is incrementally moved through a series of steps along the X and Y axes, whereby each of the intersect welds 32 is effected as described above. After the completion of the intersect welds 32, the fuel rod grid 16 is rotated 90° in a counter-clockwise direction about its Y axis so that its outer grid strap 22c is brought beneath the laser beam 178, whereby a third set of slot and tab welds 34c is carried out and a third corner seam weld 30c effected. Next, as shown in FIG. 3G, the fuel rod grid 16 is rotated 180° about its Y axis to present the fourth outer grid strap 22d to the laser beam 178, whereby a fourth set of slot and tab welds 34d, and a fourth corner seam weld 30d may be carried out. Thereafter, in the step as shown in FIG. 3H, the fuel grid 16 is rotated 90° in a counter-clockwise direction to its original position before it and its weld fixture are removed from the welding chamber.

Figure 3J:
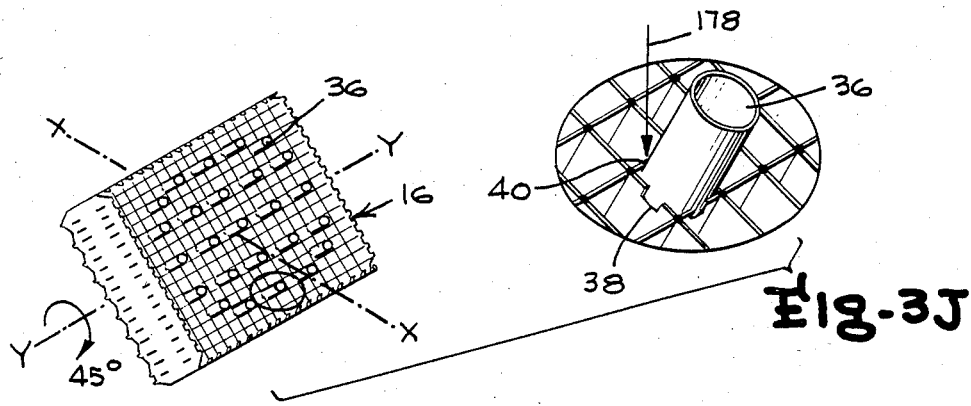
Figure 3K:
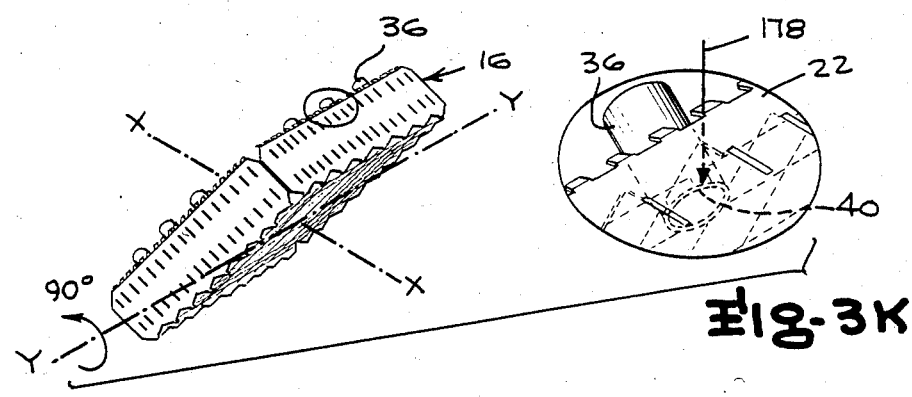
Figure 3L:
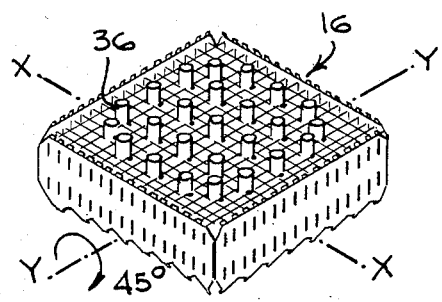

Referring now to FIGS. 3I to 3L, there is shown the process by which the guide sleeves 36 are welded to the fuel rod grid 16. Initially, the fuel rod grid 16 is removed from its welding fixture as required for the steps in FIGS. 3A to 3H and placed into a sleeve welding fixture as described in the copending application entitled "FUEL GRID WITH SLEEVES WELDED IN NOTCHED GRID STRAPS" U.S. patent application Ser. No. 414,232 filed on Sept. 1, 1982; the sleeve welding fixture includes a plurality of fixture pins disposed through selected of the cells formed by the inner grid straps 20 for receiving the guide sleeves 36, i.e. those openings having the notches 38 disposed in the peripheral edges thereof as seen in FIG. 3J. In particular, the fixture pins accurately position the guide sleeve 36 so that its axis is disposed centrally of and parallel with the surfaces of the inner grid straps 20. With the guide sleeves 36 accurately aligned and assembled with respect to the fuel rod grid 16, the grid 16 and its sleeve welding fixture are disposed into the welding chamber and affixed with respect to the chamber and to the laser beam 178. Thereafter, the air is purged with argon gas to the desired level of purity. Thereafter, as shown in FIG. 3J, the fuel rod grid 16 is rotated 45° in a counter clockwise direction and thereafter the grid and sleeve welding fixture is locked into that position at 45° with respect to the path of the laser beam 178 as shown in FIG. 3J. Thereafter, a series of notch seam welds 40 is carried out at a pulse width of 6.2 ms, at a pulse frequency of 20 pps, an average power of 255 watts, and at a welding speed of 10 IPM. The fuel rod grid 16 is moved along the Y axis at the noted rate while the laser beam 178 is pulsed. As will be explained in detail later, it is necessary to refocus the laser beam 178 for each horizontal row of guide sleeves 36 as shown in FIG. 3J. A series of notch seam welds 40 is effected by moving the fuel rod grid 16 along its Y axis, bringing each guide sleeve 36 into position with respect to the laser beam 178, turning on the laser beam to effect the notch seam weld 40, and thereafter moving the fuel rod grid 16 to align the next guide sleeve 36. After a single horizontal row of guide sleeves 36 has been welded, the fuel rod grid 16 is moved along its X axis to position the next row of guide sleeves 36 in alignment with respect to the laser beam 178. Thereafter, it is necessary to refocus the laser beam 178 to effect the notch seam welds 40. As seen in FIGS. 3J and 3K, the guide sleeve 36 fits into four notches 38, and notch seam welds 40 are effected on opposing sides of the guide sleeves 36.

After one side of the guide sleeve 36 has been welded, it is necessary to rotate the grid 16 90° in a counter-clockwise direction as shown in FIG. 3K to expose the other, opposing notch 38 to the laser beam 178. After rotation, a series of notch seam welds 40 is carried out as explained above. Finally, in step FIG. 3L, the fuel rod grid 16 is rotated 45° in a clockwise direction to its original position before the grid 16 and its sleeve welding fixture are removed from the welding chamber to complete the welding steps of the fuel rod grid 16.

Referring now to FIG. 4, there is shown the laser welding system 102 for controlling the series of welds and in particular the intersect welds 32, the slot and tab welds 34, the corner seam welds 30, and the notch seam welds 40 necessary to secure the inner and outer grid straps 20 and 22 together to form the fuel rod grid 16 and to secure the guide sleeves 36 to the grid 16 by controlling a laser system 102 (shown in detail in the subsequent drawings) to emit a laser beam 178 of controlled energy to successively and precisely position the grid 16, and to control the supply of a suitable inert gas, e.g. argon, in which to carry out the laser welding of the aforementioned welds.

The laser system 102 may, in one illustrative embodiment of this invention, take the form of that laser system manufactured by Raytheon under their model designation number SS500. The laser system 102 includes the laser rod 170 illustratively taking the form of a Nd:YAG crystal laser and a pair of linear krypton flash lamps disposed in a high efficiency, laser head. The laser head includes a total reflecting mirror 182 and a partial reflecting mirror 184 disposed on either end of the laser rod 170. An inner cavity shutter 188 is disposed between the laser rod 170 and the total reflecting mirror 182 and is selectively controlled to release a selected number of lasing pulses, whereby the energy imparted to effect laser welding may be precisely controlled in a manner to be explained below. The laser head is modularly constructed to permit all optic elements thereof including the laser rod 170, the excitation lamps 186, and the mirrors 182 and 184 to be easily and independently replaced. The excitation lamps 186 shall be quickly replaced without disturbing the optical alignment. Further, the excitation or flash lamps 186 are water cooled over their entire length, including their end connectors. Lamp triggering provides for parallel pulsing of the excitation lamps 186 by energizing the cavity. The laser rod 170 shall illustratively be selected such that 400 watts average power is obtained at the work piece with the input power to the pulse forming network not to exceed 18 KW when operating at pulse widths of 6 ms and 2 ms and pulse rates of 20 Hz and 50 Hz respectively. A dump shutter 190 is disposable in a first position to direct the laser beam 177 along a diverted path 196 into a beam absorber 194 during those periods in which the work pieces in the form of the fuel rod grids 16 are being changed within the chambers 108. An actuating mechanism 192 is shown for disposing the shutter 190 from its first beam intercepting position to a second position, wherein the beam 177 is focused by a beam expander lens assembly 198 to a beam directing mechanism comprised of the movable beam switching mirror 172 and the stationary mirror 174. When the switching mirror 172 is disposed to intercept the laser beam 177, it is diverted along path 178a to the vertically directing mirror 176a to be directed vertically. The laser focusing lens assembly 204a intercepts and focuses the laser beam 178a onto the fuel rod grid 16 within the chamber 108a. As shown, the laser focusing lens assembly 204, as will be described in detail later, includes a lens 202 and a lens carrier tube 200 as rectilinearly positioned by the Z-axis laser assembly 222. When the reflecting mirror 172 is rotated by the motor 175 from a position intercepting the laser beam 177, it is diverted by the stationary reflective mirror 174 to form the laser beam 178b as directed by the vertically directing mirror 176b towards the welding chamber 108b.

The excitation lamps 186 are energized by the power supply, which illustratively comprises a voltage regulated DC power supply which charges a pulse forming network (PFN) through a charging inductor. The related CNC 126 alternately closes switches (silicon controlled rectifiers) that charges the PFN from the DC power supply reservoir capacitor bank and discharges the PFN into the excitation lamps 186 to thereby excite the laser rod 170 to emit a series of laser pulses. The excitation lamps 186 shall operate in a "simmer" mode of operation, in which the lamp 186 are operated at a low DC current level below lasing threshold, and high current pulses are superimposed on the simmer current for generating laser pulses. The PFN shall provide illustratively pulses of 2 ms and 6 ms.

To assist in the initial alignment of the weld chamber 108 and, in particular, the fuel rod grid 16 with respect to the laser beam 178, there is provided means for sighting the grid 16 and, in particular, to determine its exact position with respect to laser beam 178 in the form of an alignment TV camera 206 that is aligned to establish an image path 214 coinciding with the path of the laser beam 178a. As shown in FIG. 6, the image path 214 is focused by a lens 210, selectively passed by a Bureau of Radiological Health (BRH) or safety shutter 212 and directed through the partially transmissive mirror 176 to the TV camera 206. The lens 202, in addition to focusing the laser beam 178 onto the fuel rod grid 16, also focuses with the assistance of lens 210 the image of the grid 16 onto the TV camera 206. As will be explained below, the laser focusing lens assembly 204 also includes an illuminating lamp that is selectively energized to illuminate the grid 16 for alignment purposes. The BRH shutter 212 is selectively opened and closed to permit alignment of the grid 16 with respect to the laser beam 178, remaining closed during all other periods as a safety measure.

As illustrated in FIG. 4, each of the welding chambers 108 may be moved from a first, welding position as shown in the dotted line to a second, out position. When the welding chamber 108 is in its second position, the laser beam 178 is directed by its vertically directing mirror 176 onto a power measuring device or thermopile 218, as supported within a shield tube 216. As will be shown later, the shield tube 216 is mounted on a rearward portion of the welding chamber 108 and includes a restricted opening 220 whereby the laser beam 178 may be effectively confined within the shield tube 216. Periodically, the welding chamber 108 is disposed to its second, out position and the laser beam 178 is directed onto the thermopile 218 to provide an indication of the power output of the laser rod 170 actually impinging onto the fuel rod grid 16. Under the heavy duty load imposed upon the laser system 102, it is contemplated that the laser efficiency will attenuate due to the exhaustion of the laser rod 170 and/or its excitation lamps 186, as well as due to the presence of smoke and debris given off during the laser welding. Thus, in order to provide accurate, reproducible welds, the voltage applied to the excitation lamps 186 is increased over the life of the laser system 102 dependent upon the thermopile measurements.

An argon supply system 473 is shown in FIG. 5 for providing a flow of a suitable inert gas, e.g. argon, to the welding chamber 108 and to the laser lens assembly 204 at selected variable rates. The laser welding of volatile materials such as Zircaloy, of which the inner and outer grid straps 20 and 22 are made, must be conducted in an inert atmosphere due to the highly reactive nature of Zircaloy to oxygen, nitrogen, and water. Welding tests have demonstrated that an inert gas flow around the immediate weld area of a work piece does not provide adequate shielding from oxygen and water to produce the desired high quality of welds that will withstand the hostile environment of a nuclear reactor without failure. The argon supply system 473 as shown in FIG. 5 includes the welding chamber 108 and the assembly 204 as particularly shown in FIG. 5. The argon supply system 473 comprises an argon supply tank 474 that is coupled to a flow valve 476 which separates the argon supply tank 474 from the remainder of the system 473. This valve 476 is kept fully open except when it is necessary to shut down the entire system. The argon flows from the tank 474 through the valve 476 to a regulator 478, which establishes the system pressure so as not to exceed a maximum level, e.g. 50 psi. It is contemplated that the flow of argon to each of the welding chambers 108a and 108b and the laser focusing lens assembly 204 will be controlled at a plurality of different rates depending upon whether the grid 16 is being loaded into the chamber 16, the chamber 108 is being purged, or a welding operation is occurring. For example, the purging of the welding chamber 108 requires a relatively high flow rate of the inert gas at which time pressure should not exceed the maximum level. To this end, a relief valve 482 is coupled to a manifold 480 for receiving the gas flow and for distributing it to each of a plurality of mass flow controllers 484, 486, and 488. The mass flow controllers 484, 486, and 488 are respectively connected to the welding chamber 108, to the rotatable fixture 242 and to the laser lens assembly 204. In particular, a controlled rate of gas flow is provided from the mass flow controller 484 via a flexible hose 490 to the manifold tubes 336, only one of which is shown in FIG. 5. In similar fashion, the gas flow from the mass flow controller 486 is directed through the flexible hose 490 to the argon input port 500, whereby argon is discharged through output ports 506 within the rotatable fixture 242. It is understood that the flexible hoses 490 are provided to permit movement of the welding chamber 108 as it is moved into and out of the cabinet 104 by a slide table. The flow of gas is directed from the mass flow controller 488 via a flexible hose 490 to the laser lens assembly 204 and in particular to the argon input port 448, whereby argon may be directed via the conduit 450 and a plurality of jets into that space immediately below the focusing lens 202 (see FIG. 4). The focusing lens 202 and in particular the laser lens assembly 204 is more fully described in the copending application entitled "LASER LENS AND LIGHT ASSEMBLY" U.S. patent application Ser. No. 414,205 filed on Sept. 1, 1982. This argon flow prevents the submicron oxides produced by the laser welding within the welding chamber 108 from contaminating the lens 202.

A moisture ($H_2O$) sensor 410 is disposed within the welding chamber 108 and is coupled with a moisture monitor 492. The operator and the computer system (to be disclosed) check the level of moisture within the welding chamber 108 during the purging and welding operations, whereby laser welding may be prohibited if the moisture content is greater than a specified level, e.g. 10 ppm. In addition, an oxygen probe 496 is disposed in the sealing plate 156 for sampling the argon drawn through the peripheral opening between the upper flange 331 of the welding chamber 108 and the sealing plate 156. It is understood that the output of the oxygen probe 496 also serves to provide an indication of the nitrogen content of the air in the chamber 108. The monitoring of the atmosphere in the welding chamber 108 is begun when the welding chamber 108 is disposed to its first, welding position. Each such oxygen probe or monitor 496 includes a calibrating gas inlet so there is a direct flow of gas to the probe 496. The output of the probe 496 is coupled to an oxygen analyzer 494 whose output in parts per million (ppm) may be displayed upon the monitor meter 498. The computer system may be programmed as will be explained so that the welding sequence will not be initiated until the oxygen level is below a programmed value, e.g. 7 ppm. During welding, the sampling of oxygen is automatically discontinued to avoid contamination of the probe 496 with welding debris.

The argon supply system 473 provides a flow of the inert gas, e.g. argon, at a substantially constant flow rate into the welding chamber 108 to maintain the atmosphere within the chamber substantially pure, i.e. below the limits of oxygen and water contamination as defined above. The flow rate is dependent upon whether the laser welding system 100 and in particular its welding chamber 108 is in its loading and unloading cycle, in its purging cycle, or in its welding cycle. As will be explained, the computer system associated with the welding chamber 108 directly controls the mass flow of controllers 484, 486, and 488 to any one of a plurality of flow rates. In particular, there are four potentiometers for each mass flow controller. The CNC 126 actuates a selected potentiometer to provide the gas flow rate required for each of the loading and unloading, purging and welding cycles. To change the program flow rate, the computer system addresses the potentiometer whereby the operator may then adjust the potentiometer to provide the desired flow rate. The flow will appear on a suitable digital display of the controller. The mass flow controllers are calibrated in standard liters per minute (SLPM).

During the load/unloading cycle, argon flow is set at a low rate to maintain the argon atmosphere as pure as possible, typically in the order of 30 CFH. A high flow rate during the load/unload cycle would cause turbulence that would draw air into the welding chamber 108. The loading/unloading of the grid 16 should be accomplished with a mechanical gripping device as described in copending application entitled "WORKPIECE GRIPPING AND MANIPULATING APPARATUS FOR LASER WELDING SYSTEMS AND THE LIKE" U.S. patent application Ser. No. 414,262 filed on Sept. 1, 1982. If such a gripping device were not employed, the operator would place his hands onto the chamber 108 thereby increasing the air/argon mixing and introducing additional undesirable moisture into the argon atmosphere. Immediately prior to the welding cycle and after the welding chamber 108 has been returned to its first, welding position, the mass flow controllers 484 and 486 are controlled by the computer system to effect a relatively high flow rate of the inert gas in the order of 400 CFH, whereby a welding chamber 108, as shown in FIG. 4 and having approximately square dimensions of 14 by 16 by 16 inches, may be purged to lower the oxygen level to below 10 ppm in approximately one minute.

After the purging cycle has been completed, the laser welding system 100 and in particular its computer system is prepared to initiate the laser welding cycle, during which a substantially lowered gas flow rate as controlled by the mass flow controllers 484 and 486 may be introduced into the welding chamber 108. The control of the non-reactive environment within the welding chamber 108 is fully disclosed in the copending application entitled "APPARATUS AND METHOD FOR LASER MACHINING IN A NON-REACTIVE ENVIRONMENT" U.S. patent application Ser. No. 414,242 filed on Sept. 1, 1982.

Figure 6A:
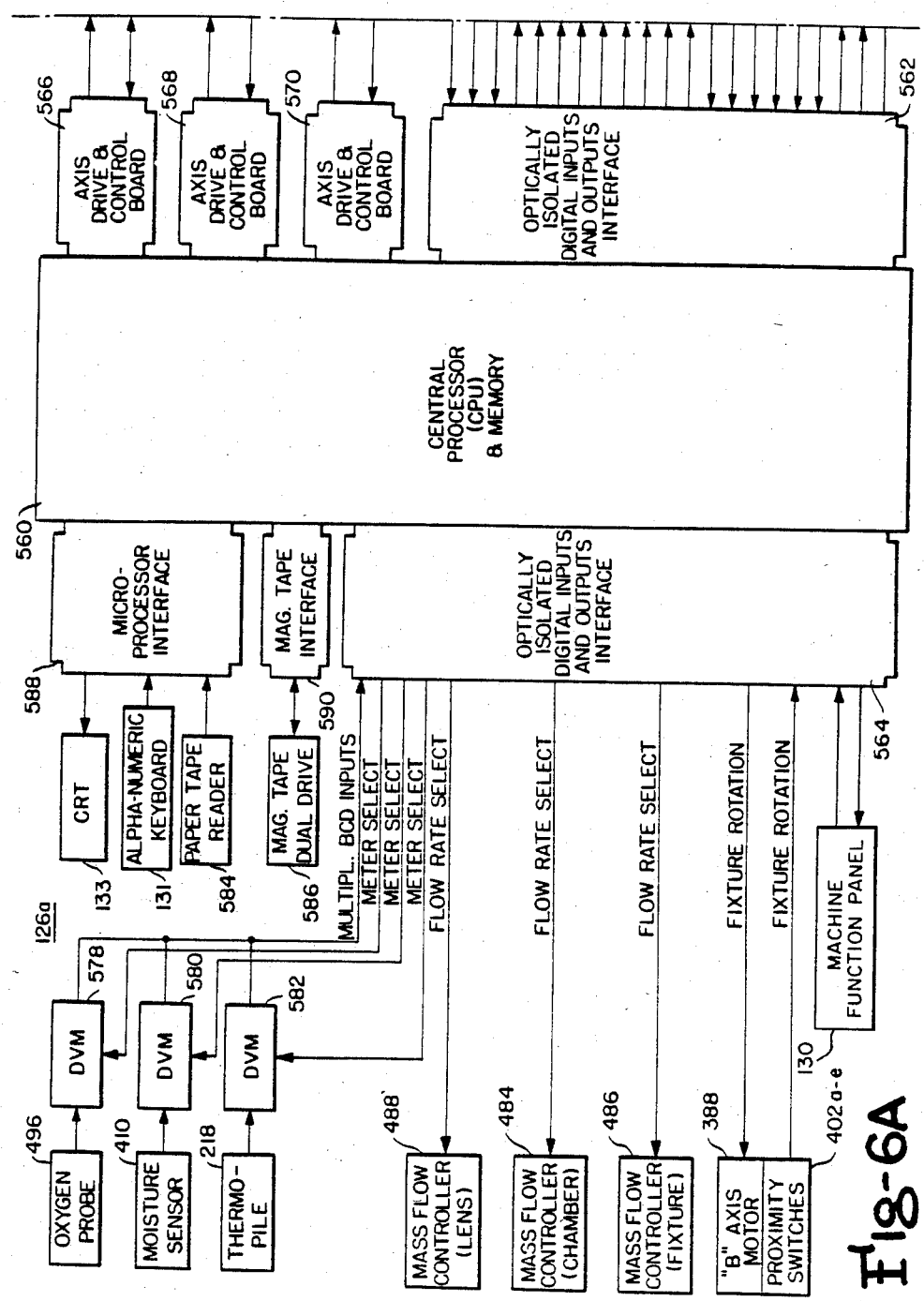
FIGS. 6A–6B form a schematic diagram of the computer implemented control system for the laser welding system showing the relationship of the interface circuits with respect to the central processor unit (CPU) and memory and to each of the chamber positioning mechanisms, a second like computer control system, the laser system, the argon supply system, the vacuum exhaust system, the B axis rotation drive, the oxygen analyzer, the moixture analyzer, and the thermopile.
Figure 6B:
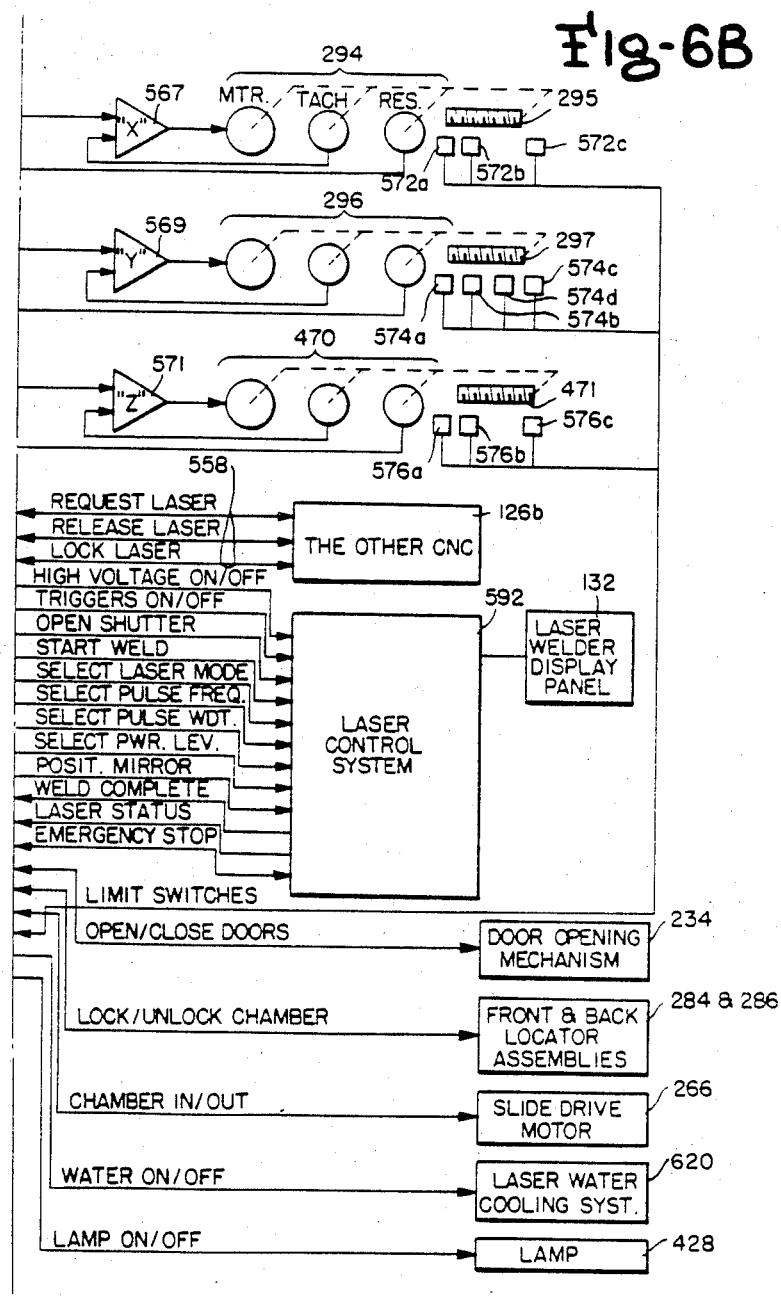

Referring now to FIGS. 6A and 6B, there is shown a functional block diagram of a computer control system in accordance with the teachings of this invention and in particular of a first computer numerical control (CNC) 126a associated with the right welding chamber 108a, as seen in FIG. 4, and the manner of its connection to the other CNC 126b represented only by a single block within the diagram. The second CNC 126a operates to control the welding process taking place in the welding chamber 108b. In this regard, it is understood that the other CNC 126b comprises the same elements as does CNC 126a, as shown in FIGS. 6A and 6B. The CNC 126a comprises a central processor unit (CPU) and memory identified by the numeral 560. In an illustrative embodiment of this invention the CNC 126 and in particular its CPU 560 may take the form of that computer as manufactured by the assignee of this invention under their model number 2560. The CPU 560 is provided with 64K of core memory and is particularly adapted in its architecture and in its programming for machine control. It is understood that a standard 2560 CNC contains a basic supervisory software termed herein as either a main task loop system or operating program, which acts in the nature of an executive program to oversee the operation of the entire system. In the data structure as established within the model 2560 CNC, sets of codes, i.e. S, T, and M codes, are used to effect special or customized operations for which the 2560 CNC is readily adapted. In particular, a part program is programmed with the M, S, and T codes call or bid subroutines termed herein application subroutines, whereby selected functions including the control of the argon flow and of selecting a particular welding mode are carried out. Further, the part program is programmed with X, Y, and Z codes that control the movement imparted by the X and Y drive motors 294 and 296 to the work piece, and the Z drive motor 470 to the laser lens assembly 204, respectively. In particular, the X and Y codes designate the amount of movement or destination to which the work piece in the form of the fuel rod grid 16 is to be moved between welding steps. In like fashion, the Z code controls the amount of movement to be imparted to the laser lens assembly 204, whereby the laser beam 178 is focused upon the fuel rod grid 16. In particular, the Z codes are needed to effect the notch seam welds 40, wherein the rotatable fixture 242 is rotated out of its normal plane perpendicular to the laser beam 178 thereby necessitating the refocusing of the laser lens assembly 204. In addition, the memory of the CPU 560 has a special storage area known as the Part Program Storage Area, which is used to store the part program for execution by the operating system program. As will be explained, the part program basically designates the steps of the process of welding in a controlled, inert atmosphere and more specifically, is programmed with the M, S, and T codes, whereby the mode of welding and the rate of argon flow are effectively controlled. The Parts Program Storage Area stores the part program as described below in FIGS. 7A and 7B, and the application routines of relevant interest are described in FIGS. 8A to 8D. The part program is entered into the memory of the CPU 560 by a magnetic tape drive 586 via interface 590; in an illustrative embodiment of this invention, the magnetic tape drive 586 may take the form of that drive as manufactured by Qantex under its number 220. Alternatively, the part program can be stored on a paper tape and entered via a paper tape reader 584 via a micro-processor interface 588; illustratively, the paper tape reader 584 may take the form of that reader as manufactured by Decitex. Additionally, the micro-processor interface 588 also permits display of data messages upon a CRT 133. In addition, various parameters may be entered into the memory of the CPU 560 by the operator upon an alphanumeric key board 131 via the interface 588.

As shown in FIGS. 6A and 6B, the CPU 560 is associated through a plurality of closed loop axis drive and control boards 566, 568 and 570 associated respectively with the X and Y drive motors 294 and 296, and with the Z axis drive motor 470. It is understood that each of the drive motors is associated with its tachometer and resolver to provide an indication of the rate of travel, as well as the distance of travel, whereby extremely accurate control of the movement of their X, Y, and Z tables is effected. It is understood that the X and Y tables (not shown) are respectively associated with the X and Y drive motors 294 and 296, which serve to move their tables and the welding chamber 108 carried thereby with respect to the laser beam 178 directed thereto. In similar fashion, the Z table (not shown) is associated with the Z drive motor 470 that serves to reposition the laser lens assembly 204 as carried by the Z table to focus the laser beam 178 onto the fuel rod grid 16. The X, Y and Z tables, as well as their drive motors, are fully described in the copending application entitled "APPARATUS AND METHOD FOR LASER MACHINING IN A NON-REACTIVE ENVIRONMENT" U.S. patent application Ser. No. 414,242 filed on Sept. 1, 1982. Further, the control output signal as derived from the control board 566 is applied to a servo amplifier 567 to be compared with a signal indicative of motor speed, to provide an output signal to actuate the Y drive motor 296. As shown schematically, each of the motors 294, 296, and 470 is associated with a lead screw 295, 297, and 471 that effects drive of its corresponding X, Y and Z tables. A set of limit switches 572 are associated with the lead screw 295 to sense the position of the lead screw 295 and, therefore, its X positioning table 290 and to provide signals via an input and output interface 562 to the CPU 560. In particular, the limit switches 572a and 572c provide output signals indicative that the X positioning table has been disposed to its forward and rearward most limits of travel, whereas the limit switch 572b indicates that the X positioning table is disposed at its home or reference position with respect to the laser beam 178. A similar set of limit switches is associated with the lead screw 471 driving the Z axis table. A set of limit switches 574a, b, and c is provided with the lead screw 297 driving the Y table 292; a fourth limit switch 574d is associated with the lead screw 297 for detecting when the Y positioning table 292 has been disposed in its center position, i.e. that position at which the welding chamber 108 may be removed from the cabinet 104.

As seen in FIGS. 6A and 6B, a host of peripheral devices are associated with and controlled by the CPU 560 by optically isolating interfaces 562 and 564. In particular, the other CNC 126b interchanges a set of "handshaking" signals via a CNC link 558 and the interface 562 with the CPU 560, whereby each of the CNC's 126a and 26b may bid for and obtain control of the beam switching mirror 172 in a time shared fashion. In accordance with the teachings of this invention, each of the two CNC's 126a and 126b may bid for and subsequently control the beam switching mirror 172 to direct the laser beam 178 into its welding chamber 108. As shown in FIG. 6, the CNC link 558 includes three lines marked respectively REQUESTED LASER, RELEASE LASER and LOCK LASER. As will be explained below in detail with respect to the application subroutines, each control computer and in particular each CNC 126a and 126b bids for exclusive control of the beam directing means in the form of the stepping motor 175 for driving the movable, beam switching mirror 172 configured as a tear-drop shaped member, whereby the laser beam 177 is directed along a first laser path 178a and thereafter, along a second laser path 178b respectively to two distinct work pieces in the form of the fuel rod grids 16. Each fuel rod grid 16 is received by its work station taking the form of a first welding chamber 108a and a second welding chamber 108b. As explained above, each welding chamber 108a and 108b is associated with means for moving it along X and Y axes in the form of the X-Y positioning system 288, whereby the fuel rod grid 16 is repositioned after a machining operation, e.g. weld, in preparation for the next machining step. Only one of the CNC's 126a and 126b, as shown in FIGS. 6A and 6B, may gain control at one time of the movable, beam switching mirror 172 and the laser control system 592. In a sense, the two CNC's 126a and 126b communicate with each other in a "handshaking" manner to inform the other CNC that it is presently controlling the laser source, thereby prohibiting the other CNC from gaining access to either the movable beam switching mirror 172 or the laser control system 592. More specifically, when the first CNC 126a has gained control of the beam directing means in the form of the mirror 172, it applies a LOCK LASER signal via that line of the CNC link 558 to the other CNC 126b, whereby the other CNC 126b is prohibited from gaining access to the movable, beam switching mirror 172. Each CNC 126, when wishing to gain access to the laser source checks to see if the other CNC has placed a LOCK LASER or REQUEST LASER output upon the CNC link 558. If not, the other computer 126b places a REQUEST LASER output upon its line and waits for the CNC 126a to place a RELEASE LASER output upon the CNC link 558. When the other CNC 126b has placed a REQUEST LASER output on the CNC link 558, it locks or dedicates the laser source to its use and then begins to apply control signals, whereby the laser beam is directed to its work piece. At that point, the other CNC 126b places a LOCK LASER output upon the CNC link 558, whereby the CNC 126a is prohibited from any use of the laser source. It is evident that the presence of either a REQUEST LASER or LASER LOCK signal will inhibit the other CNC from generating and placing a REQUEST LASER signal upon the CNC link 558. In this manner, the two independently running CNC's 126a and 126b are able to communicate with each other concerning the time shared use of the laser rod 170 and its beam switching mirror 172. Thus, each CNC 126a and 126b may continue to operate at very high speeds without interfering with the other and in particular, without attempting to gain control of the laser control system 592 or the beam switching mirror 172 when the other CNC is using it.

The laser system 102 may in one illustrative embodiment of this invention take the form of that laser system as manufactured by Raytheon under their model number SS500 and comprises the laser power supply, as well as a laser control system 592 that is coupled by the interface 562 to the CPU 560. As shown in FIG. 6B, the laser control system 592 is coupled to a laser welding display panel 132. The laser welding display panel 132 includes an array of lamps and pushbuttons that control and display the condition of the laser system 102 and its control system 592.

As seen in FIGS. 6A and 6B, the CPU 560 provides control signals via the optically isolated interface 562 to actuate the laser control system 592. In particular, interface outputs are applied to the laser control system 592 to turn on or off the high voltage output of the power supply 120, to enable the laser lamp triggers, to dispose the inter-cavity shutter 188 to its open position and the BRH safety shutter 212 to its closed position, to initiate the welding process, to select a particular mode of laser welding dependent on one of the codes M51 through M54, to set the pulse frequency (REP RATE) as derived from the T code, to set the power level as derived from the S code, to set the pulse width, and to position the beam switching mirror 172. Signals are developed by the laser control system 592 indicative of the completion of a weld as well as the laser status to be applied via the optically isolated interface 562 to the CPU 560. Upon generation of emergency stop signals, the operations of the laser welding system 102 and in particular of the laser control system 592 may be stopped in an emergency.

FIG. 6B generally shows the output of the CNC 126a and in particular, its optically isolated interface 562 as connected to the laser control system 592. It is understood that the other CNC 126b is also connected to the laser control system 592, as will now be explained with regard to FIG. 9. As explained above, only one of the CNC's 126a and 126b can actively gain control at one time of the movable, beam switching mirror 172 (as shown in FIG. 4) and the laser control system 592. In an illustrative embodiment of this invention, the laser beam 177 emitted from the laser rod 170, is split and directed along separate laser beam paths 178a and 178b to be focused onto first and second work pieces as contained within the welding chambers 108a and 108b, respectively. It is contemplated that similar types of machining operations and in particular welding, will be carried out in the same time frame within each of the welding chambers 108a and 108b; in particular, the type or mode of welding carried out in each welding chamber 108 will be the same, as selected from one of the intersect welds 32, corner seam welds 30, slot and tab welds 34 and notch seam welds 40. It is understood that each of such weld types will be carried out at substantially the same pulse width and pulse frequency. However, individual adjustment is permitted for the welding to be carried out in each welding chamber 108 due primarily to the different optical characteristics, as shown in FIG. 4, of the optical paths of the laser beams 178a and 178b. It is contemplated that each laser path 178a and 178b will present slightly different degrees of attenuation of the laser beam and thus, its power. These differences are accommodated by individually calibrating the laser beam as directed along the laser paths 178a and 178b, to provide a set of calibrated offsets for that path, whereby a power adjust and in particular the laser voltage as applied to the excitation lamps 186, may be adjusted separately for each of the laser paths 178a and 178b. Such calibration apparatus and method are fully described in the copending application entitled, "CALIBRATION OF AUTOMATED LASER MACHINING APPARATUS" U.S. patent application Ser. No. 414,272 filed on Sept. 1, 1982.

Figure 9A:
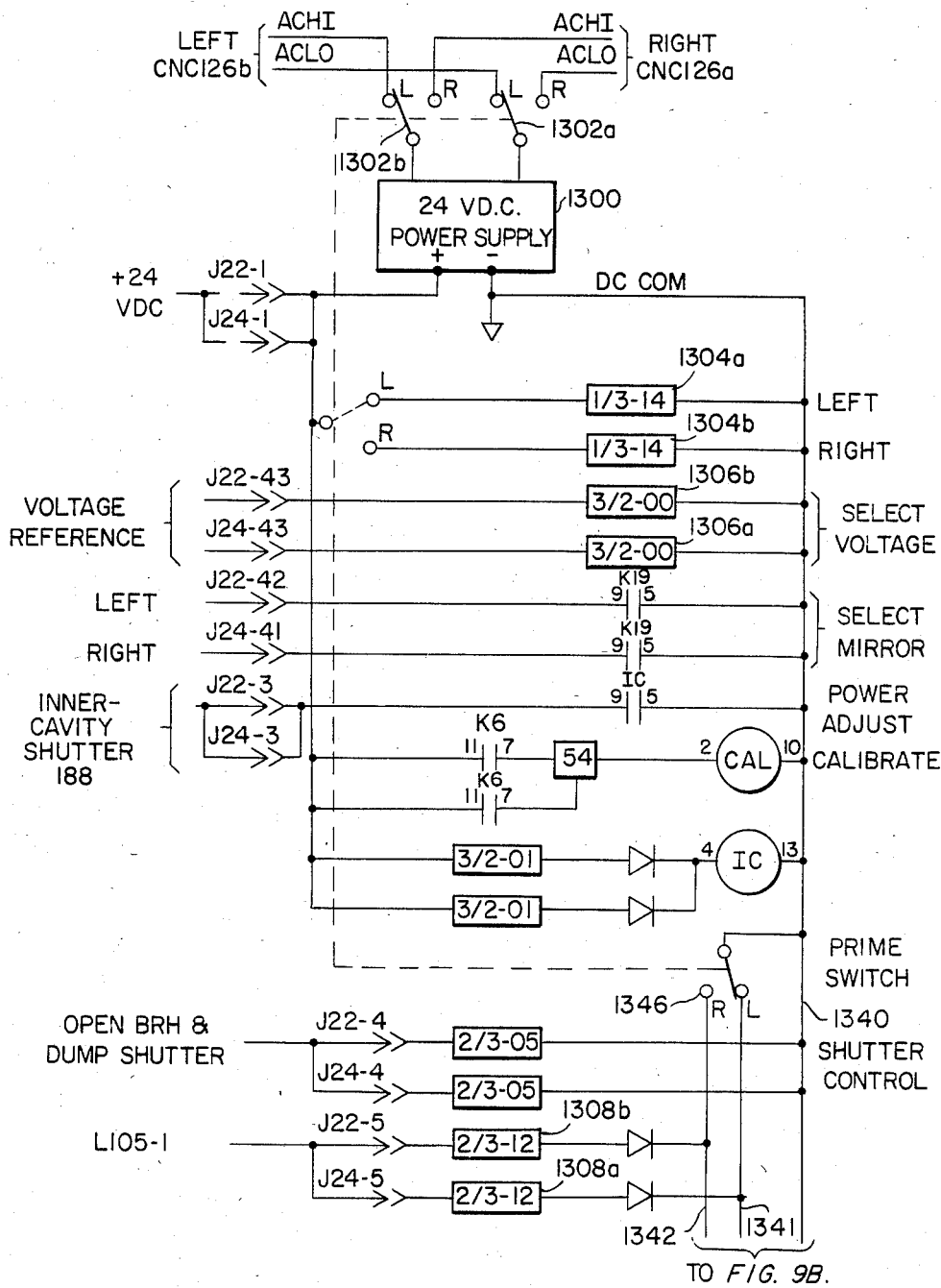
FIGS. 9A, 9B, and 9C show a circuit diagram of the interconnection between each of the plural computer controls and the laser control system in accordance with the teachings of this invention.

The circuit as shown in FIGS. 9A, B, and C permits one of the plural CNC's 126a or 126b to be designated as the selected or prime CNC 126 to thereby control the pulse frequency and pulse width of the laser beam emitted from the laser rod 170, while permitting each of the CNC's 126a and 126b to set its own laser voltage dependent upon the optical characteristics of its own laser beam path and associated optics. In particular, first and second switches 1302a and 1302b are set in one of two positions to designate one of the two CNC's 126a and 126b as the prime CNC, whereby a DC voltage is applied to the input of that CNC selected to be the prime CNC. In addition, the switches 1302a and 1302b are mechanically connected to a third switch 1346 that is coupled to apply the negative output of a power supply 1300 to a selected one of the lines 1341 or 1342. As shown in FIG. 9A, the negative DC voltage is also applied to a common line 1340. Each of the lines 1342 and 1342 is selectively connected to a plurality of enabling devices that permit the output of one of the CNC's 126a and 126b to be applied to the corresponding input of the laser control system 592 dependent upon which of the CNC's 126a and 126b has been designated as the prime CNC. For example, if the switches 1302a, 1302b and 1346 are set as shown in FIG. 9A, the second or left CNC 126b is designated as the prime CNC, whereby that CNC controls which mode of welding is to take place and also the frequency and pulse width of the laser beam 177. For example, switch 1346 applies a negative voltage to the bus 1341, whereby the enabling device 1308a is actuated by that voltage, whereby a circuit is completed between the CNC 126b and the intersect weld control input of the laser control system 592. As shown in FIG. 6B, the select laser mode input to the laser control 592 includes a plurality of inputs designating whether the weld will be an intersect, corner, sleeve or tab weld, and in the example described above, all of the inputs setting one of the intersect, corner, the sleeve or the tab welds will be derived from the CNC 126b. It is understood that the enabling devices 1309a 1310a and 1311a are similarly deactuated, whereby the outputs derived from the CNC 126b are coupled to the laser control system 592. On the other hand, the corresponding outputs from the CNC 126a are disconnected, whereby control of the welding mode is dedicated to the CNC 126b.

Figure 9B:
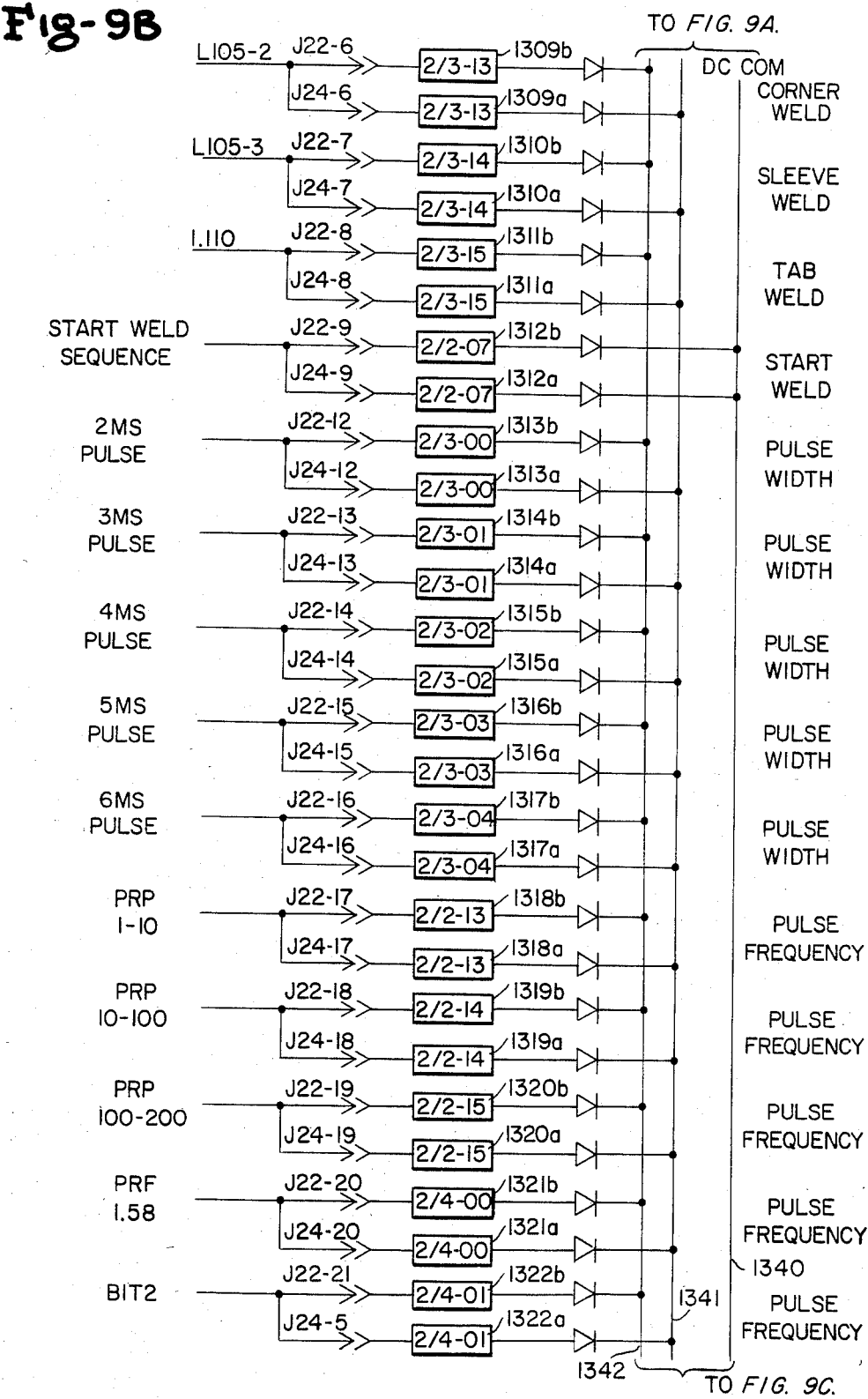
Figure 9C:
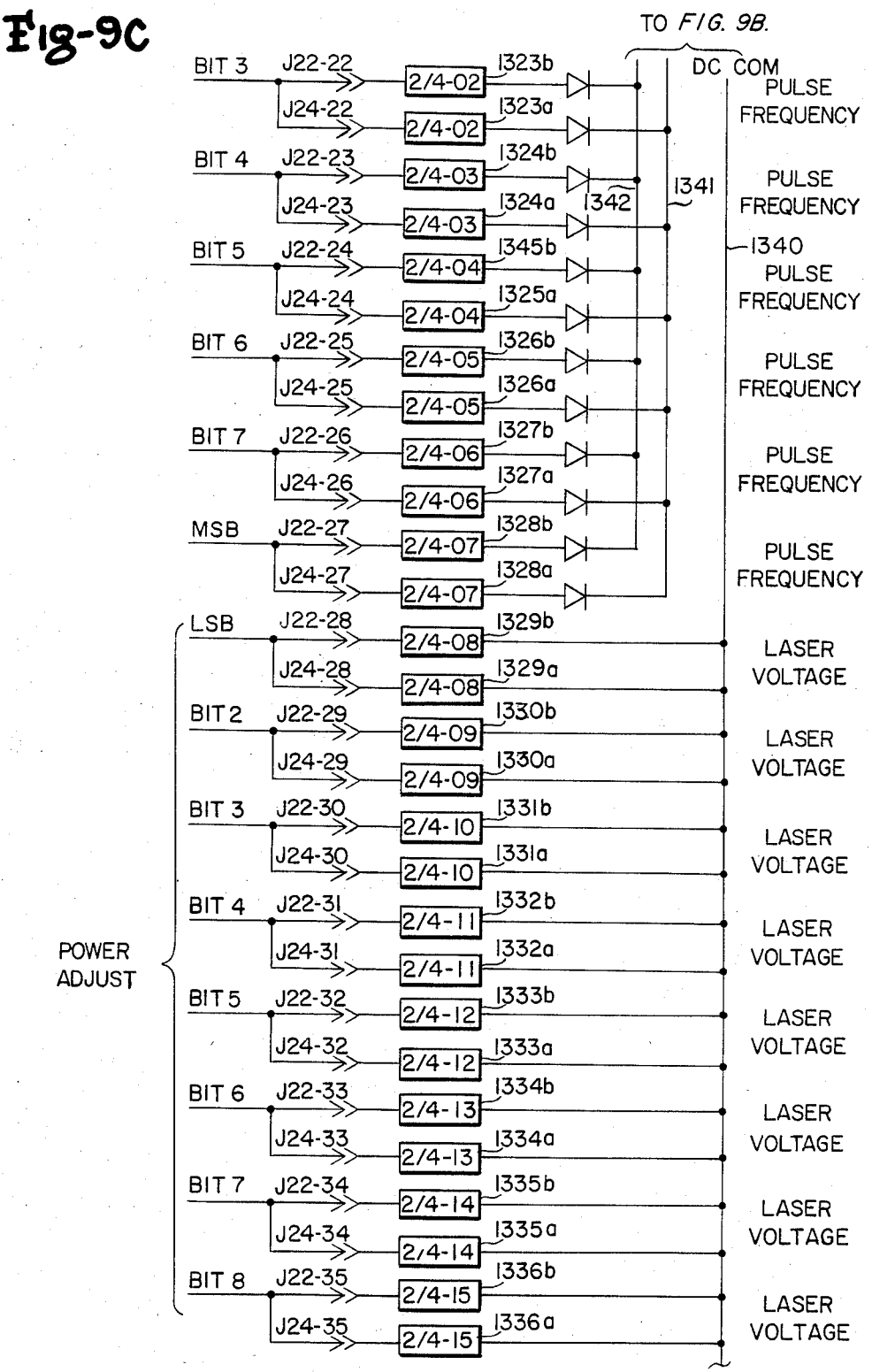

The select pulse width input of the laser control system 592, as shown in FIG. 6B, is more fully shown in FIG. 9B as including five inputs corresponding to each of the 2 ms, 3 ms, 4 ms, 5 ms and 6 ms pulse widths. For the example given above, each of the enabling devices 1313a, 1314a, 1315a, 1316a and 1317a are enabled, whereby the CNC 126b applies its control signal indicative of the selected pulse width to the laser control system 592. Likewise, the range and the particular frequency within the range of the pulse frequency is set by a corresponding set of enabling devices 1318 through 1328; for the example given above, the enabling devices 1317a through 1328a are enabled by the negative voltage applied thereto by the common line 1341, whereby the CNC 126b sets the desired pulse frequency of the laser control system 592. However, as shown in FIG. 9C, the laser voltage is set by each of the CNC's 126a and 126b, i.e. each of the sets of enabling devices 1329 through 1336 is enabled in that each thereof is applied to the common line 1340, whereby each of the CNC 126a and 126b controls the excitation voltage applied to the excitation lamps 186 in accordance with the calibration procedures as fully described in the copending application entitled "CALIBRATION OF AUTOMATED LASER MACHINING APPARATUS" U.S. patent application Ser. No. 414,272, filed on Sept. 1, 1982.

Further, signals are developed by the CPU 560 and are transmitted by the optically isolated interface 562 to control a door opening mechanism 234 to either open or close doors associated with a cabinet housing the welding chambers 108. Signals are applied to lock or unlock the welding chamber 108 and, in particular, are applied to each of front and back locator assemblies 284 and 286. The front and back locator assemblies 284 and 286 are associated with a slide table (not shown) upon which one of the welding chambers 108 is mounted so that each welding chamber 108a and 108b may be moved from a first in position corresponding to the position in which the welding chamber 108a is shown in FIG. 4, and a second position corresponding to that of the welding chamber 108b as shown in full line in FIG. 4 to permit calibration of its laser beam 178b. More particularly in the second position, the laser beam 178b is directed onto a measuring device known as a thermopile 218, whereby the power of the incident laser beam 178 may be precisely measured to provide desired calibration. The front and back locator assemblies 284 and 286 accurately lock and position the sliding table and thus its welding chamber 108 and fuel rod grid 16 with respect to its laser beam 178. The slide drive motor 266 as shown in FIG. 6B serves to drive the slide table between its in and out positions. The slide drive motor 266, the slide table and the front and locator assemblies 284 and 286 are fully shown and described in the copending application entitled "MOVABLE MACHINING CHAMBER WITH ROTATABLE WORK PIECE FIXTURE" U.S. patent application Ser. No. 414,263 filed on Sept. 1, 1982.

The output signals as derived from the sets 572, 574 and 576 of limit switches are applied to the interface 562. Signals are also applied to a laser water cooling system 620. The laser flash or excitation lamps 186 and the cavity as defined by the mirrors 182 and 184 are cooled by the closed loop water cooling system which provides clean, pure, temperature-regulated water at the required pressure and flow rate. Though not shown, it is well understood in the art that the laser water cooling system includes a pump, a water-to-water heat exchanger, a reservoir, a deionizer, a filter, and a temperature regulator. Heat from the laser rod 170 and the beam absorber 194 is discharged to the water and removed from the system. In addition, a control signal is applied to a lamp of the laser lens assembly 204, to illuminate the fuel rod grid 16, whereby the X-Y positioning system 288 may be adjusted along either the X or Y axis to align the starting point of the fuel rod grid 16 with respect to the laser beam 178.

Inputs are provided from the oxygen probe 496 and the moisture sensor 410 that are disposed with respect to the welding chamber 108, as seen in FIG. 5, to provide analog signals indicative in parts per million of the oxygen and water within the welding chamber atmosphere. In similar fashion, the thermopile 218 as disposed with the shield tube 216 provides an analog signal indicative of the power of the laser beam 178 directed therein. The outputs of each of the probe 496, the sensor 410, and the thermopile 218 are applied to corresponding digital volt meters 578, 580, and 592, which convert the input analog signals to corresponding digital signals to be applied via the optically isolated interface 564 to the CPU 560. The interface 564 provides appropriate meter select signals to each of the digital volt meters 578, 580, and 582 to selectively apply only one digital signal at a time via the interface 564 to the CPU 560. Depending upon the operation of the laser welding system 100, the CPU 560 applies signals via the optically isolated interface 564 to each of the mass flow controllers 488, 484, and 486 to control the rate of argon flow respectively to the laser lens assembly 204, the rotatable fixture 242 and the welding chamber 108. In similar fashion, signals are applied to a B axis motor 388, whereby the positioning wheel 358 and the rotatable fixture 242 may be rotated. The angular position of the positioning wheel 358 is sensed by the plurality of proximity switches 402a-d to provide a binary signal that is applied by the interface 564 to the CPU 560. The operation and structure of the B axis motor 388 to rotatively drive the rotating fixture 242, as seen in FIG. 4, and of the proximity switches 402a-d to sense the angular position of the rotatable fixture 242 is fully described in the copending application entitled, "MOVABLE MACHINING CHAMBER WITH ROTATABLE WORK PIECE FIXTURE" U.S. patent application Ser. No. 414,263 filed on Sept. 1, 1982.

The process of welding the inner grid straps 20 together and in turn to the outer grid straps 22 and the resultant grid 16 to the guide sleeves 36 has been described above with respect to FIGS. 3A to 3K; in these figures, there is illustrated the series of movements of the fuel rod grid 16 in each of its X, Y, and Z axes to appropriately position the fuel rod grid 16 with respect to the laser beam 178, whereby each of the intersect welds 32, the corner seam welds 30, the slot and tab welds 34, and the notch seam welds 40 may be effected. The inner and outer grid straps 20 and 22 are assembled to form the fuel rod grid 16 as explained in the copending applications entitled "STRAP AND VANE POSITIONING FIXTURE FOR FUEL ROD GRID AND METHOD" U.S. patent application Ser. No. 414,197 filed on Sept. 1, 1982 and "GRID ASSEMBLY FIXTURE, RETENTION STRAP AND METHOD" Ser. No. 414,198 filed Sept. 1, 1982. Next, the fuel rod grid 16 is disposed upon a welding fixture as described in the copending application entitled "WELDING PLATES FOR A FUEL ROD GRID" U.S. patent application Ser. No. 414,265 filed on Sept. 1, 1982; the welding fixture in turn is releasably affixed by the locating pins 524 to the rotatable fixture 242 rotatably disposed within the welding chamber 108. As explained above, the fuel rod grid 16 may be rotated about its B axis to dispose the fuel rod grid 16 in position to receive the laser beam 178 to effect the notch seam welds 40. Each CNC 126 selectively actuates its X and Y positioning tables in a sequence of incremental steps along their X and Y axes to position the fuel rod grid 16 with respect to the laser beam 178, whereby the intersect welds 32 are effected, and after rotation upon the rotatable fixture 242, the slot and tab welds 34, and the corner seam welds 30 are effected.

The machine control for this process is provided by the CNC 126 and in particular by the CPU 560, which includes a memory for storing the part program 700, which will now be described with respect to FIGS. 7A and 7B. The part program 700 is entered when in step 702, the operator places the CNC 126 in its automatic mode by pressing an AUTO pushbutton on the machine function panel (MFP) 130. Next, the operator enters a command on the alpha-numeric keyboard 131 panel to call the part program for execution. Next, the operator presses the CYCLE START pushbutton on the MFP 130. Next, in step 708, a programmed M81 code calls a LOAD/UNLOAD CHAMBER application subroutine to effect the actuation of the slide drive motor 266 to drive its slide table from its first welding to its second, out position, whereby an operator may load an assembled, though not yet welded fuel rod grid 16 and its weld fixture onto the rotatable fixture 242. The fuel rod grid 16 and its welding fixture was locked by the locating pins in a predetermined position on the rotatable fixture 242 with respect to the laser beam 178. The welding fixture, as well as the locating pins that serve to position and lock the welding fixture with respect to the rotatable fixture 242 are fully described in the copending application entitled, "WELDING PLATES FOR FUEL ROD GRID" U.S. patent application Ser. No. 414,265 filed on Sept. 1, 1982. In step 710, the operator loads the fuel rod grid 16 and its welding fixture onto the rotatable fixture 242, with the assistance of the load-/unload manipulator as described in the copending application, entitled "WORKPIECE GRIPPING AND MANIPULATING APPARATUS FOR LASER WELDING SYSTEMS AND THE LIKE" U.S. patent application Ser. No. 414,262 filed on Sept. 1, 1982. At the end of step 708, the execution of the part program is suspended until in step 712, the operator presses the CYCLE START pushbutton to recommence the execution of the part program. Next, step 714 calls the LOAD/UNLOAD application subroutine to reload the chamber 108 into its first or welding position beneath the laser beam 178. Once repositioned, an M code is used to call the CHAMBER ENVIRONMENT CHECK application subroutine before the welding chamber 108 is purged of impurities such as oxygen and water by introducing argon at a relatively high rate via the manifold tubes 336 into the welding chamber 108, whereby the heavier argon displaces the air driving it out over the edge of the welding chamber 108. The particular argon flow rate is set by an M code, whereby the mass flow controller 484 is set to provide a high rate of flow to the welding chamber 108. In similar fashion, the mass flow controllers 486 and 488 associated with the rotatable fixture 242 and the laser lens assembly 204 are set to a higher flow rate to hasten the purging of the welding chamber 108. The particular M code calls the SELECT GAS FLOW RATE application routine. Next, step 716 of the part program sets the M91 codes to effect rotation of the rotatable fixture 242 and in particular to actuate the B axis rotation drive 238 to effect rotation of the fixture 242. In particular, the M91 code as executed by step 716 bids the ROTATE FIXTURE application subroutine. Step 718 serves to initiate or bid the CHAMBER ENVIRONMENT CHECK application subroutine to monitor the environment within the welding chamber 108 as to its oxygen and water content and to prevent the further execution of the part program until the levels of oxygen and water are below predetermined levels.

After step 718 has determined that the environment within the welding chamber 108 is sufficiently pure, step 720 responds to X and Y codes to controllably drive the X and Y drive motors 294 and 296, whereby the initial weld of the fuel rod grid 16 to be made, is positioned along the Z axis coinciding with the laser beam 178. The initial welding position is identified by a set of X and Y codes which are interpreted to provide appropriate control signals to the X and Y drive motors 294 and 296. In similar fashion, a Z code is interpreted and control signals are applied to the Z axis drive motor 470, whereby the laser lens assembly 204 is positioned to focus the laser beam 178 onto the initial weld of the fuel rod grid 16. After completion of these steps, step 720 brings the part program to a stop. In step 722, the operator may manually control by appropriate actuation of the X IN pushbutton, the X OUT pushbutton, the Y LEFT pushbutton and the Y RIGHT pushbutton of the machine function panel 130, the position of the X and Y positioning tables, whereby the initial weld of the fuel rod grid 16 is precisely aligned with respect to the laser beam 178. To this end, the BRH safety shutter 212 is opened, permitting the operator to view the grid image as displayed upon the CRT 133 and obtained from the alignment TV camera 206. The lens of the camera 206 has an electronics rectical by which the operator may align the initial weld precisely with respect to the laser beam 178. In similar fashion, the operator manipulates the Z UP pushbutton and the Z DOWN pushbutton of the machine function panel 130 to control the movement of the laser lens assembly 204 to precisely place the laser lens 202, whereby the laser beam 178 is focused onto the fuel rod grid 16.

In order to reinitiate the execution of the parts program, the operator in step 724 presses the CYCLE START pushbutton. Next, in step 726, the part program calculates the differences between the X and Y coordinates of the initial weld position and of the aligned position, i.e. the new grid position after being aligned in step 722, the differences being known as the X and Y offsets. Similarly, the difference between the initial home position along the Z axis and the focused position of the laser lens assembly 204 provides a Z offset. The X, Y and Z offsets are stored in a designated area in memory and are used by the CNC 126 to calculate the precise position of each weld taking into account the adjusted or offset position of the fuel rod grid 16.

Next, step 728 sets the various parameters of the laser system 102 and in particular programs the S, T, and M codes that determine the power level, the pulse frequency, the pulse width, and the type of weld, i.e. which of the intersect weld 32, the corner seam weld 30, the slot and tab weld 34, and the notch seam weld 40, to be performed. In particular, the power level of the laser system 102 is determined by an S code which is serviced by a SERVICE S CODE application subroutine. In similar fashion, the pulse frequency is set by a T CODE which is serviced by the SERVICE T CODE application subroutine. The pulse width is set by one of the M CODES M55–M60 corresponding to widths of 1 to 6 ms, which bid the execution of the SET LASER PULSE WIDTH application subroutine. In similar fashion, there are four types of welds corresponding to the M codes M51 through M54, which bid the execution of the SET LASER MODE application subroutine. Next, step 730 sets by use of one of the M CODES M61 througbh M64 the particular argon flow rate that is required for a welding operation and in particular bids the SELECT GAS FLOW RATE application subroutine. Next, in step 732, the set one of the M codes M51 through M54 bids the PERFORM LASER WELD application subroutine, as will be explained in greater detail with respect to FIG. 8A. Generally, the PERFORM LASER WELD application subroutine first requests or bids for the use of the laser via the GET LASER application subroutine as shown in FIG. 8D, whereby the other CNC 126b is checked by examining the REQUEST LASER and LOCK LASER outputs of the other CNC 126b and if present, the CNC 126a waits until the appearance of a RELEASE LASER output from the other CNC 126b, at which time the CNC 126a requests and thereafter locks the laser for its use. Upon obtaining the use of the laser system 102, the CNC 126a disposes the beam switching mirrors 172 to direct the laser beam 178 to its welding chamber 108. Thereafter, the positions of the X and Y positioning tables are checked to see if they have come to rest in their proper position and a positioning time out period is permitted to expire, before firing the laser rod 170. Then, step 732 waits for a LASING COMPLETE signal indicating that the welding step has been completed before releasing the beam switching mirror 172 and commanding the X and Y drive motors 294 and 296 to move the fuel rod grid 16 to its next position in preparation for performing the next in a series of welds. Next, step 736 decides whether the particular type of weld as set by one of the M codes M51 through M54 has been completed and if not, the part program returns to step 732 to perform the next weld and then in step 734, to move the fuel rod grid 16 to its next weld position. Thereafter, step 735 determines whether the M code M88 has been programmed to bid for the WAIT FOR OTHER CNC application subroutine, whereby a signal is transmitted to the other CNC 126b to indicate that a series of welds has been completed and then to wait for a response from the other CNC 126b; during this interval, the part program execution is suspended.

After a particular type of weld has been completed, the part program moves to step 738 where the part program stops and examines which of the M codes M51 through M54 has been programmed to determine the next type of weld. Thereafter, in step 740, a decision is made as to whether all of the types of welds necessary to complete the welding of at least one side of the fuel rod grid 16 have been made and if not, the part program returns to step 716, whereby the sequence of steps 716 through 738 is repeated. The first sequence of welding steps as illustrated in FIGS. 3A to 3D is carried out on the vane side of the nuclear fuel rod grid 16 before it is then necessary to remove the fuel rod grid 16 from its welding chamber 108 to be rotated and returned to the welding chamber 108. In step 742, the laser system 102 is turned off by sending a signal to dispose the dump shutter 190 to a position as shown in full line of FIG. 4 to direct the laser beam 177 into the laser absorber 194.

Thereafter, step 744 sets the M code M82 to bid for the LOAD/UNLOAD CART application subroutine, whereby the slide drive motor 266 is actuated to direct the slide table to its second, out position (see the position of the welding chamber 108b in FIG. 4), whereby the fuel rod grid 16 may be removed from the welding chamber 108. At this point, the operator brings the manual manipulator to remove the fuel rod grid 16 and its welding fixture 542 from the welding chamber 108 to perform those manual operations in preparation for the next sequence of welding steps. For example, after the intersect welds 32 on the vane side of the fuel rod grid 16 are completed as in the steps shown in FIGS. 3A to 3D, the fuel rod grid 16 is removed and rotated so that the intersect welds 32 as appearing on the opposite or guide sleeve side of the fuel rod grid 16 may be completed as seen in the steps of FIGS. 3E to 3H. After the intersect welds on both sides of the fuel rod grid 16 have been completed, the grid 16 is removed and the guide sleeves 36 are inserted therein, before effecting the notch seam welds 40 as shown in the steps 3I to 3L.

Figure 7B:
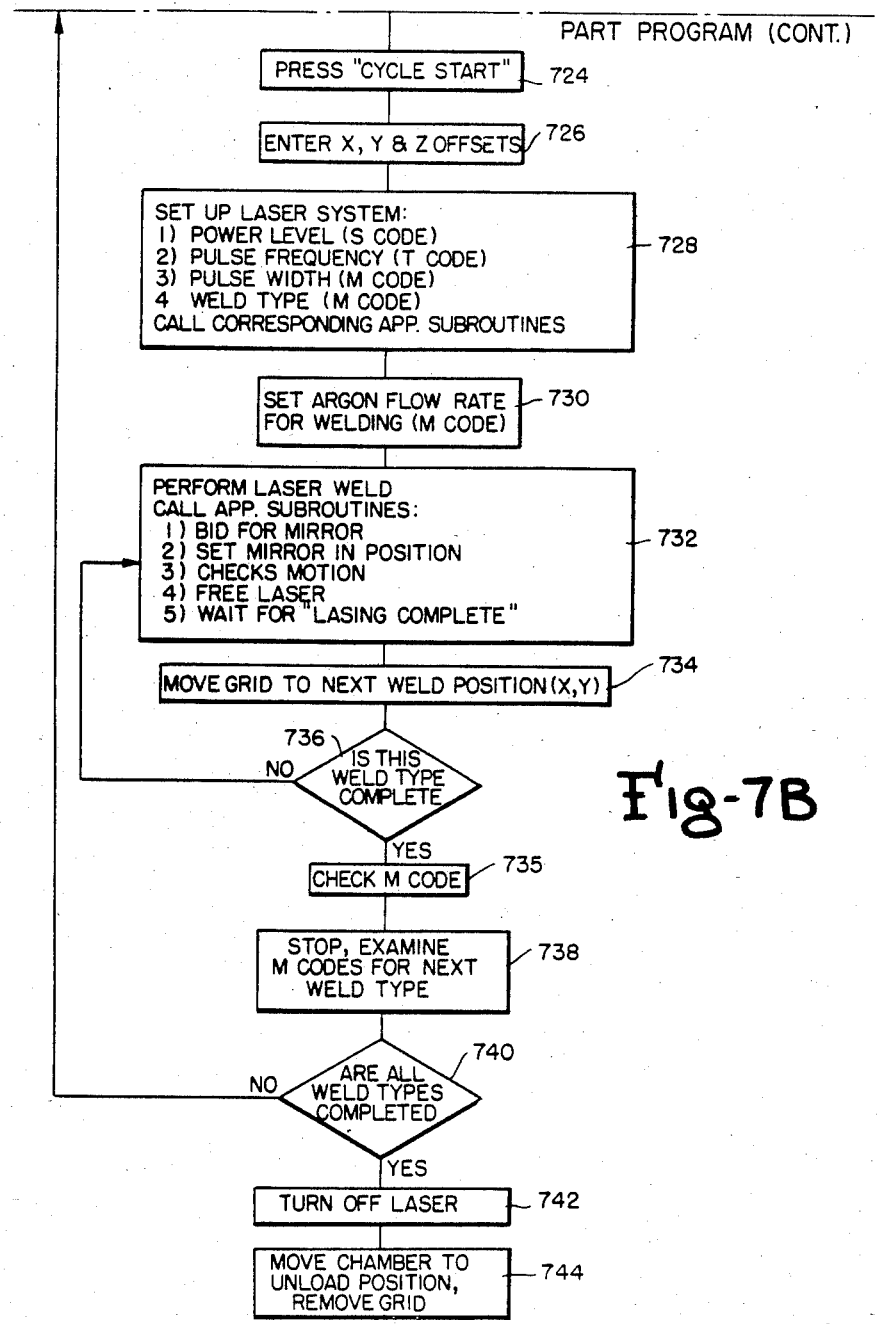
Figure 8B:
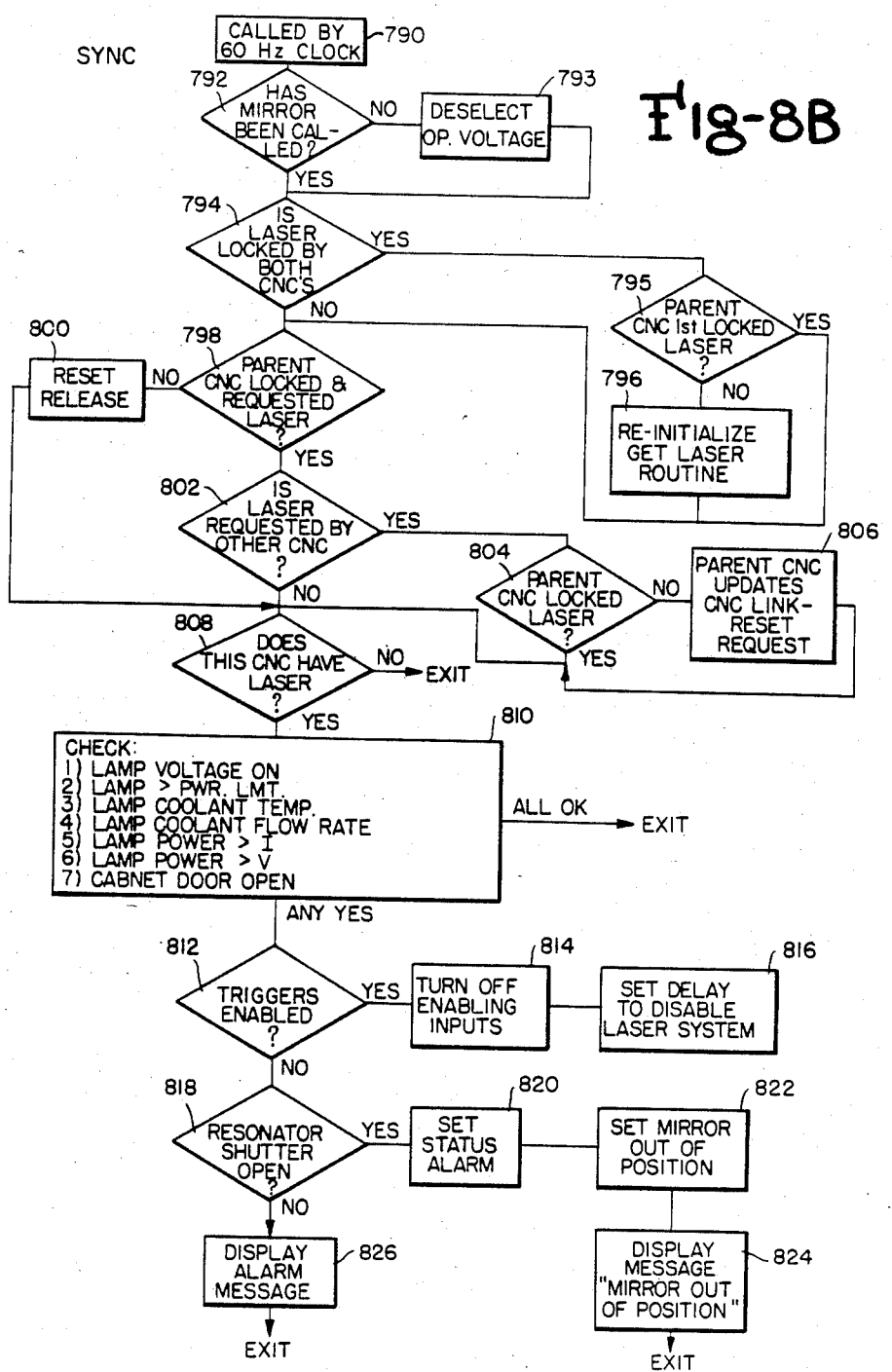
Figure 8D:
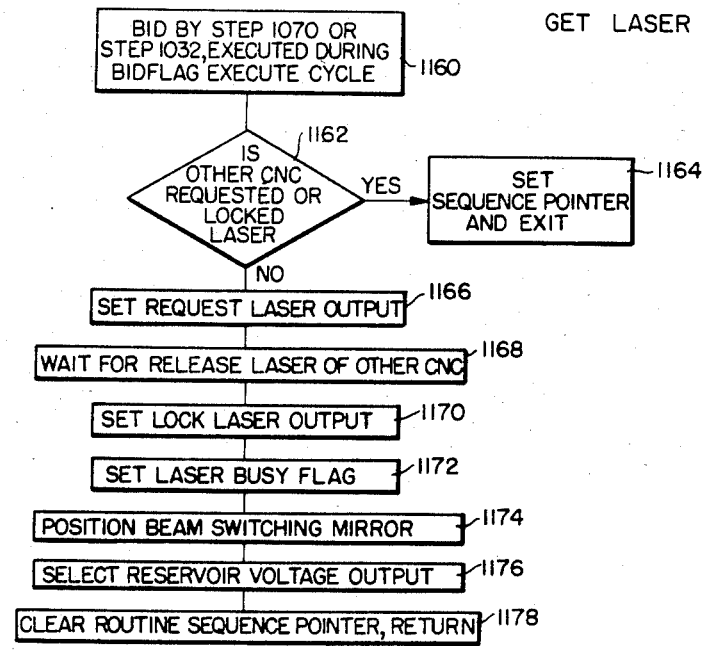

Referring now to FIG. 8B, there is shown the SYNC application subroutine that is called in step 790 of the part program of FIG. 7 by the 100 Hz clock of the CPU 560. Step 792 determines whether the beam switching mirror 172 is in the position that would direct the laser beam 178 to the welding chamber associated with the other CNC 126b has not been commanded to change its position. If no, step 793 deselects the laser's operating voltage by the parent CNC 126a. It is understood that each of the parent CNC 126a and the other CNC 126b time shares the control of the laser system 102, wherein only one CNC 126 has control at any one instant of time. Further, one of the CNC's 126a and 126b is designated as the prime CNC, as explained above, and sets the pulse width and REP RATE, which parameters the other CNC adopts. However, each CNC 126a and 126b performs its own calibration process that is a function of the optical path that the laser beams 178a and 178b travel into the corresponding welding chambers 108a and 108b. In this regard, it is understood that the degree of attenuation imparted by each optical system to its laser beam 178 differs to some degree and further the welding process occurring in each welding chamber 108 may have a different effect, i.e. the coating of its laser focusing lens 202. After calibration, each CNC 126a and 126b will calculate its own value of the reservoir voltage RESVOLT that is applied via its own digital/analog converter to the laser control system 592, as shown in FIG. 6B. Thus, it is necessary when one of the CNC's 126a or 126b releases control of the laser system 102, that it deactuates its digital/analog convertor as would otherwise apply its operating or reservoir voltage to the laser control system 592; in other words, each CNC 126 deselects its operating voltage as indicated in step 793. Next, step 794 determines whether both CNC's 126a and 126b have currently locked the laser, and, if yes, step 795 determines whether the parent CNC 126a has locked the laser. If no, step 796 causes the parent CNC 126a to unlock the laser and to re-initialize the GET LASER application subroutine, as shown in FIG. 8D. Next, step 798 determines whether the parent CNC 126a has both locked and requested the laser and if not, the parent CNC 126 resets the laser release signal as applied in step 800 via the CNC link 558 to the other CNC 126b as shown in FIG. 6B before proceeding directly to step 808. If yes, step 802 determines whether the other CNC 126b has applied a laser request signal via the CNC link 558 to the parent CNC 126a and if yes, the routine moves to step 804 which decides whether the parent CNC 126a has locked the laser system 102 by applying a laser lock signal to the CNC link 558; if not, the parent CNC 126a updates in step 806 the CNC link 558, resetting its laser request signal before proceeding to step 808.

When the parent CNC 126a has locked the laser, i.e. has applied a laser lock signal via the CNC link 558 to the other CNC 126b, the routine initiates a laser status check. Initially, step 808 determines whether the parent CNC 126a has control over the laser, i.e. is the busy flag generated, and if not, the subroutine exits. If yes, the application subroutine checks in step 810 various laser parameters including whether the lamp voltage is on, whether the excitation lamps 186 are operating at their less than maximum power limit, the temperature of the lamp coolant, the flow rate of the lamp coolant, the current and voltage as drawn by the laser power supply, and whether the cabinet door is open. If all are OK, an exit is made from this subroutine. If any of the lamp parameters are not within limits, step 812 determines whether the laser trigger circuits are enabled and if yes, step 814 turns off the laser enabling circuits before setting a delay to disable the laser system 102. If step 812 decides no, step 818 determines whether the innercavity shutter 188 is open and if yes, step 820 sets the alarm status, before step 822 disposes the beam switching mirror 172 out of position and step 824 displays a suitable alarm message "MIRROR OUT OF POSITION" on the CRT 133. If the inner-cavity shutter 188 is closed, step 826 immediately displays the alarm message on the CRT 133.

One of the two CNC's 126 is designated as the PRIME CNC and in effect controls the pulse width and frequency of the pulsing of the laser control system 592 of the other CNC. However, each CNC 126 selectively controls the reservoir voltage or output voltage from its laser power supply, whereby an individual adjustment may be made of the power level of the laser beam 178 as applied to the welding chamber 108 associated with each CNC 126. Since each welding chamber 108 is effecting a similar type of weld, a single CNC 126 designated as PRIME selects the pulse width and REP RATE, whereas an individual adjustment of the reservoir voltage or RESVOLT is desired to permit individual adjustment of each of the laser beams directed to each welding chamber 108 for the different conditions of the separate optical paths, laser lens assemblies 204 and welding chambers 108.

The PERFORM LASER WELDS application subroutine is shown in FIG. 8A and is bid by the M codes M71 and M72 as set in step 728 of the part program of FIG. 7 and executed during the next Bidflag Execute Cycle. Upon entering in step 1060, the application subroutine Bidflag is set to execute on the subsequent Bidflag Execute Cycle. After entering, step 1062 determines whether one of the laser modes corresponding to one of the codes M51 through M54 has been selected. As explained above, the laser control system 592 includes four separate modules, each hard wired and programmed to control one of the intersect welds 32, slot and tab welds 34, corner seam welds 30 or notch seam welds 40. If no, step 1063 displays an "ERROR MESSAGE" before exiting the routine. If yes, step 1064 checks to determine whether the GO flag had been previously set in step 882 of the CHAMBER ENVIRONMENT CHECK application subroutine. If not, the step 1066 rebids the CHAMBER ENVIRONMENT CHECK application subroutine to again determine whether the atmosphere within the welding chamber 108 has been purified so that its oxygen and water content is below the specified limits. If yes, step 1068 actuates the beam switching mirror 172 to direct the laser beam 178 to the welding chamber 108 of this CNC 126. Thereafter, the dump shutter 190 is disposed to its open position, whereby the laser beam 177 is directed into the selected welding chamber 108. Thereafter, step 1072 determines whether the M code M71 has been set. As indicated above, there are two M codes, i.e. M71 and M72, the code M71 indicating that a spot weld, corresponding to the intersect welds 32, is to be performed, whereas an M72 code indicates that a seam weld corresponding to the corner seam welds 30, the slot and tab welds 34, and the notch seam welds 40 is to be effected. A seam weld differs from a spot weld in that the fuel rod grid 16 is moved by the X-Y positioning system 288 while the laser rod 170 emits a series of pulses of the laser beam 178, whereas a spot weld is effected with the fuel rod grids 16 being kept stationary with respect to the laser beam 178. Thus, if an M71 CODE is detected, indicative that a spot weld is to be performed, step 1074 effects a delay to wait for the X-Y positioning system 288 to come to a halt before causing the laser rod 170 to fire. On the other hand, if an M72 CODE is programmed indicating that a seam weld is to be performed, no delay is imparted thus permitting the laser rod 170 to initiate welding before the movement of the fuel rod grid 16 begins. Next, step 1076 checks to determine whether the voltage applied to the excitation lamps 186 is as programmed. Thereafter, step 1078 checks the status of the laser and in particular determines whether the temperature and flow rate of the lamp coolant are within specified limits, whether the current and voltage of the lamp power are within specified limits, and whether the cabinet door 114 is open. Thereafter, step 1080 determines whether the lamp trigger circuits have been successfully triggered by step 1012 of the SET LASER POWER LEVEL OFFSET application subroutine. If not set, step 1082 displays an alarm message "Trigger Circuit Not Enabled" on the CRT 133. If enabled, step 1084 effects laser firing by enabling the shutter control module of the laser control system 592, i.e. applies the start weld signal thereto. Step 1086 initiates the timing of a delay period during which the laser rod 170 is programmed to complete its lasing, i.e. waits to receive the weld complete signal from the laser control system 592. Step 1088 determines whether a period of eight seconds has expired and if not expired, displays a message "Lasing Completion Time Out" on the CRT 133. After timing out, step 1092 determines whether a spot weld is to be performed, i.e. has the M CODE M71 been set, and if so, the subroutine moves to step 1096 wherein the CPU 560 generates via the optical interface 562 a Release Laser Signal on the CNC link 558 indicating that the laser rod 170 has been released and that the other CNC 126b may now request the laser. If a seam weld has been performed, step 1094 closes the dump shutter 190 and the safety BRH shutter 212, before exiting in step 1096.

The WAIT FOR OTHER CNC application subroutine is shown in FIG. 8C and permits the parent CNC 126a to complete a series of welds and thereafter, suspend execution of the part program as shown in FIGS. 7A and 7B while waiting for a response from the other CNC 126b. This application subroutine is called by an M code M88 as set in step 735 of the part program shown in FIG. 7 and executed during the subsequent Bidflag Execute Cycle of the main task loop. This application subroutine provides a delay in which the other CNC 126b may complete its welding operations on its fuel rod grid 16 after the parent CNC 126a has completed a particular type of weld and would otherwise change the common welding parameters, i.e. of pulse width and REP RATE, as used by both CNC's 126a and 126b. In this regard, only one of the two CNC's 126 is set as the PRIME CNC 126a to thereby control the pulse width and REP RATE, the other CNC 126b adopting the pulse width and REP RATE set by the PRIME CNC 126; thus, the PRIME CNC 126a must delay resetting its pulse width and REP RATE until the other CNC 126 has completed its welding operations for a particular weld type. Thus, after step 736 determines that a first type of weld has been completed, a check of the M code M88 is made, thus calling the WAIT FOR OTHER CNC application subroutine. After entry in step 1030, step 1032 suspends execution of the part program as shown in FIGS. 7A and 7B and therefore maintains the same weld type and its REP RATE and pulse width until the other CNC 126b has completed its welding operations. To this end, step 1034 determines whether this CNC is selected as the PRIME CNC and if yes, step 1040 determines whether the other CNC is currently running. If not, this application subroutine moves directly to step 1048. If the other CNC is running, step 1044 sets a timing period in which the other CNC 126b may set its DONE WELD flag, before in step 1046 setting its WAIT WELD signal and initiating a delay. If this processor CNC 126 is not PRIME, step 1036 sets the WAIT WELD for this CNC, while step 1038 waits for the PRIME CNC to set its DONE WELD manifestation. In this manner, the delay set in step 1046 is provided for the other CNC 126b to complete its laser welding operations before step 1048 clears the WAIT WELD flag and then exits.

The GET LASER application subroutine is shown in FIG. 8D and provides the means whereby one CNC 126 may communicate via the CNC link 558, as shown in FIG. 6B to bid for the use of the laser system 102. It is understood that only one of the CNC's 126a and 126b may have active control over the laser system 102, as shown in FIG. 4, at any instant of time. Thus, to permit the coordination between the two CNC's 126a and 126b, the first CNC 126a that is actively controlling the laser system 102 places a LOCK LASER signal upon the CNC link 558. After relinquishing use of the laser system 102, the first CNC 126a will place a RELEASE LASER signal on the CNC link 558, whereby the second CNC 126b seeking control of the laser system 102 may then impose a REQUEST LASER signal on the CNC link 558. Thereafter, the second CNC 126b obtains use of the laser system 102 and imposes a LOCK LASER signal on the CNC link 558, whereby the first CNC 126a is inhibited from gaining access to the laser system 102. As shown in step 1160, the GET LASER application subroutine is bid by any one of the SET LASER POWER LEVEL OFFSET application subroutine, the LASER CALIBRATION application subroutine, or step 1070 of the PERFORM LASER WELDS application subroutine, and is executed during the subsequent Bidflag Execute Cycle of the operating system program. After entry, step 1162 examines the CNC link 558 to determine whether the second CNC 126b has set its REQUEST LASER or its LOCK LASER outputs and if so, step 1164 sets the sequence pointer on the first CNC 126a and exits. On the other hand, if the second CNC 126b has not requested or locked the laser system 102, the first CNC 126a places a REQUEST LASER output upon its optically isolated interface 562 to the CNC link 588. Thereafter, step 1168 initiates a wait for the RELEASE LASER output of the second CNC 126b. After the second CNC 126b imposes its RELEASE LASER output upon the CNC link 558, the first CNC 126a in step 1172 sets its laser busy flag and imposes a LOCK LASER output upon the CNC link 558, before in step 1174 actuating the laser switching mirror 172 to direct the laser beam to the welding chamber 108 associated with the first CNC 126a. Thereafter in step 1176, the first CNC 126a sets its reservoir voltage output, before in step 1178, clearing the routine sequence pointer and returning to the calling subroutine.

Thus, the GET LASER application subroutine effects the scanning of the CNC link 558 to prevent a first CNC 126a from gaining access to the movable, beam switching mirror 172 as shown in FIG. 4 or to the laser control system 592 as shown in FIG. 6B, when the other CNC 126b has either requested or locked the control of their use. After the other CNC 126b that has present control of the laser control system 592 has finished with its use of the laser, it generates a release laser signal upon the CNC link 558, whereby the first CNC 126a may now request and subsequently obtain control of the mirror 172 and the laser control system 592.

In considering this invention, it should be remembered that the present disclosure is illustrative only and the scope of the invention should be determined by the appended claims.

We claim:

1. Plural computer controlled apparatus for laser machining at least first and second work pieces, said plural computer controlled apparatus comprising:
   (a) a single, time shared laser source for emitting a laser beam in the form of laser pulses of a controllable frequency and pulse width;
   (b) beam directing means disposed to intercept the laser beam, and operative in a first mode for directing the laser beam along a first laser path, and in a second mode for directing the laser beam along a second laser path distinct from said first laser path;
   (c) first and second work stations for respectively receiving the first and second work pieces and disposed to intercept said first and second laser paths respectively;
   (d) first and second optical means associated respectively with said first and second laser paths for focusing the laser beam onto the first and second work pieces; and
   (e) first and second computer control means for controlling respectively the laser machining of the first and second work pieces, and each operatively coupled to said beam directing means for disposing said beam directing means to operate in said first and second modes respectively, said first and second computer control means coupled to each other to permit only one of said first and second computer control means to gain control of said beam directing means to operate in its corresponding mode, while excluding the other of said first and second computer control means from gaining access to said beam directing means.

2. The plural computer controlled apparatus as claimed in claim 1, wherein each of said first and second computer control means comprises means for enabling and inhibiting its control of said beam directing means, and link means for intercoupling said enabling/inhibiting means of each of said first and second computer control means.

3. The plural computer controlled apparatus as claimed in claim 2, wherein each of said enabling/inhibiting means is responsive to gaining control of said beam directing means for applying a laser lock manifestation to said link means, whereby the other of said first and second computer control means is inhibited from gaining control from said beam directing means.

4. The plural computer controlled apparatus as claimed in claim 3, wherein said enabling/inhibiting means of one of said first and second computer control means applies a laser request manifestation to said link means, whereby the other of said first and second computer control means is inhibited from gaining access to said beam directing means.

5. The plural computer controlled apparatus as claimed in claim 4, wherein said enabling/inhibiting means of one of said first and second computer control means applies to said link means a laser release manifestation indicating that said one of said first and second computer control means has completed its laser machining, whereby the other of said first and second computer control means may now request and lock the control of said beam directing means.

6. The plural computer controlled apparatus as claimed in claim 1, wherein each of said first and second work stations includes means for positioning said work station with respect to its laser path.

7. The plural computer controlled apparatus as claimed in claim 6, wherein each of said positioning means is operative during each of said first and second modes.

8. The plural computer controlled apparatus as claimed in claim 7, wherein there is included laser control means for controlling the emission of said single, time shared laser source, and one of said first and second computer control means is selected as a prime computer control means and is operatively coupled to said laser control means for controlling the operation of said single, time shared laser source.

9. The plural computer controlled apparatus as claimed in claim 8, wherein said prime computer control means is operatively coupled by first enabled circuit means to said laser control means for controlling the pulse width of said single, time shared laser source.

10. The plural computer controlled apparatus as claimed in claim 9, wherein said prime computer control means is operatively coupled by second enabled circuit means to said laser control means for controlling the frequency of the laser pulses emitted by said single, time shared laser source.

11. The plural computer controlled apparatus as claimed in claim 9, wherein said single, time shared laser source includes calibratable radiation excitation means for adjusting the power of the laser beam emitted by said single, time shared laser source.

12. The plural computer controlled apparatus as claimed in claim 11, wherein each of said first and second work stations includes means for measuring the power of the laser beam, and each of said first and second computer control means comprises calibration means for calibrating said calibratable radiation excitation means dependent upon the measured power of the laser beam.

13. The plural computer controlled apparatus as claimed in claim 6, also including laser control means for operating said single, time shared laser source in a selected one of a plurality of lasing modes, with each of said first and second computer control means operable in said selected one lasing mode to actuate its corresponding said positioning means to sequentially move its corresponding one of said first and second work stations in a sequence of steps, for laser machining its corresponding one of said first and second work pieces.

14. The plural computer controlled apparatus as claimed in claim 13, wherein one of said first and second computer control means is selected as a prime computer control means for controlling the lasing mode of said laser control means, and each of said first and second computer control means comprises delay means for delaying a change of lasing mode by said prime computer control means until the other of said first and second computer control means has completed its sequence of laser machining in said selected one lasing mode.

15. Controlled apparatus for performing a sequence of laser machining steps on each of at least first and second work pieces, said controlled apparatus comprising:
   (a) a single, time shared laser source for emitting a laser beam in the form of laser pulses of a controllable frequency and pulse width;
   (b) beam directing means, operative selectively in one of first and second modes, for directing the laser beam along distinct first and second laser paths to the first and second work pieces, respectively;
   (c) first and second work stations for respectively receiving the first and second work pieces, said first and second work stations disposed respectively to intercept said first and second laser paths, each of said first and second work stations including means for controllably positioning its work piece with respect to its laser path;
   (d) first and second optical means associated respectively with said first and second laser paths for focusing the directed laser beam onto the first and second work pieces; and
   (e) control means for disposing said beam directing means to operate in one of its first and second modes to direct the laser beam to a corresponding one of said first and second work stations, while controllably actuating said positioning means of the other of said first and second work stations to move its work piece in preparation for the next sequenced laser machining step.

16. The controlled apparatus as claimed in claim 15, also including first and second computer control means for controlling respectively the laser machining steps on the first and second work pieces, and each operatively coupled to said beam directing means for disposing said beam directing means to operate in said first and second modes respectively, said first and second computer control means coupled to each other to permit only one of said first and second computer control means to gain control of said beam directing means to operate in its corresponding mode, while excluding the other of said first and second computer control means from gaining access to said beam directing means.

17. The controlled apparatus as claimed in claim 16, wherein each of said first and second computer control means comprises means for enabling and inhibiting its control of said beam directing means, and link means for intercoupling said enabling/inhibiting means of each of said first and second computer control means.

18. The controlled apparatus as claimed in claim 17, wherein each of said enabling/inhibiting means is responsive to gaining control of said beam directing means for applying a laser lock manifestation to said link means, whereby the other of said first and second computer control means is inhibited from gaining control from said beam directing means.

19. The controlled apparatus as claimed in claim 18, wherein said enabling inhibiting means of one of said first and second computer control means applies a laser request manifestation to said link means, wereby the other of said first and second computer control means is inhibited from gaining access to said beam directing means.

20. The controlled apparatus as claimed in claim 19, wherein said enabling/inhibiting means of one of said first and second computer control means applies to said link means a laser release manifestation indicating that said one of said first and second computer control means has completed its laser machining steps, whereby the other of said first and second computer control means may now request and lock the control of said beam directing means.

21. The controlled apparatus as claimed in claim 15, wherein each of said positioning means is operative during each of said first and second modes.

22. The controlled apparatus as claimed in claim 21, wherein there is included laser control means for controlling the emission of said single, time shared laser source, and one of said first and second computer control means is selected as a prime computer control means and is operatively coupled to said laser control means for controlling the operation of said single, time shared laser source.

23. The controlled apparatus as claimed in claim 22, wherein said prime computer control means is operatively coupled by first enabled circuit means to said laser control means for controlling the pulse width of said single, time shared laser source.

24. The controlled apparatus as claimed in claim 23, wherein said prime computer control means is operatively coupled by second enabled circuit means to said laser control means for controlling the frequency of the laser pulses emitted by said single, time shared laser source.

* * * * *